US012514083B2

(12) United States Patent
Lee et al.

(10) Patent No.: US 12,514,083 B2
(45) Date of Patent: Dec. 30, 2025

(54) DISPLAY APPARATUS WITH ORGANIC DIODES BLOCKING STATIC ELECTRICITY IN TOUCH SIGNAL DISTRIBUTION

(71) Applicant: Samsung Display Co., Ltd., Yongin-Si (KR)

(72) Inventors: Seungchan Lee, Yongin-si (KR); Cheolku Kang, Yongin-si (KR); Raeyoung Gwak, Yongin-si (KR); Seongjun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/769,396

(22) Filed: Jul. 11, 2024

(65) Prior Publication Data

US 2025/0176380 A1 May 29, 2025

(30) Foreign Application Priority Data

Nov. 23, 2023 (KR) .......................... 10-2023-0164855

(51) Int. Cl.
*G06F 3/041* (2006.01)
*H10K 59/131* (2023.01)
*H10K 59/40* (2023.01)
*G09G 3/3233* (2016.01)

(52) U.S. Cl.
CPC ......... *H10K 59/131* (2023.02); *G06F 3/0412* (2013.01); *G06F 3/04164* (2019.05); *H10K 59/40* (2023.02); *G09G 3/3233* (2013.01); *G09G 2300/0842* (2013.01); *G09G 2330/04* (2013.01); *G09G 2354/00* (2013.01)

(58) Field of Classification Search
CPC . G06F 3/0412; G06F 3/04164; H10K 59/131; H10K 59/40; G09G 2330/04
See application file for complete search history.

(56) References Cited

U.S. PATENT DOCUMENTS

| 7,864,254 B2 | 1/2011 | Kim et al. |
| 10,732,775 B2 | 8/2020 | Kim et al. |
| 10,775,916 B2 | 9/2020 | Kim et al. |
| 11,031,579 B2 | 6/2021 | Monestier et al. |

(Continued)

FOREIGN PATENT DOCUMENTS

| KR | 10-1363714 B1 | 2/2014 |
| KR | 10-2020-0058535 A | 5/2020 |

(Continued)

*Primary Examiner* — Liliana Cerullo
(74) *Attorney, Agent, or Firm* — Innovation Counsel LLP

(57) ABSTRACT

Provided is a display apparatus including a substrate including a display area and a peripheral area outside the display area, light-emitting diodes arranged in the display area, an electrode unit including electrode groups arranged on the light-emitting diodes, a touch driving pad arranged in the peripheral area, a touch signal distribution unit arranged in the peripheral area and electrically connected between the electrode unit and the touch driving pad, and a static electricity blocking unit electrically connected to the touch signal distribution unit and including organic diodes, wherein each of the organic diodes includes a first electrode, a second electrode arranged on the first electrode, and organic layer between the first electrode and the second electrode.

20 Claims, 12 Drawing Sheets

(56) References Cited

U.S. PATENT DOCUMENTS

| | | |
|---|---|---|
| 11,127,352 B2 | 9/2021 | Kang et al. |
| 2016/0098953 A1* | 4/2016 | Ko .................. H10D 89/931 |
| | | 345/76 |
| 2018/0190720 A1* | 7/2018 | Yueh .................. H10K 59/40 |
| 2018/0284926 A1* | 10/2018 | Kim .................. G06F 3/044 |
| 2020/0135833 A1* | 4/2020 | Ma .................. H10K 59/131 |
| 2022/0319437 A1* | 10/2022 | Du .................. H10K 59/131 |
| 2023/0147566 A1 | 5/2023 | Hong et al. |
| 2024/0211067 A1* | 6/2024 | Wang .................. G06F 3/0412 |
| 2024/0393898 A1* | 11/2024 | Shi .................. G06F 3/0412 |

FOREIGN PATENT DOCUMENTS

| | | |
|---|---|---|
| KR | 10-2021-0092863 A | 7/2021 |
| KR | 10-2508964 B1 | 3/2023 |
| KR | 10-2023-0068049 A | 5/2023 |

\* cited by examiner

DISPLAY APPARATUS WITH ORGANIC DIODES BLOCKING STATIC ELECTRICITY IN TOUCH SIGNAL DISTRIBUTION

CROSS-REFERENCE TO RELATED APPLICATION

This application is based on and claims priority, under 35 U.S.C. § 119, to Korean Patent Application No. 10-2023-0164855 filed on Nov. 23, 2023 in the Korean Intellectual Property Office, the disclosure of which is incorporated by reference herein in its entirety.

BACKGROUND

1. Field

One or more embodiments relate to a display apparatus.

2. Description of the Related Art

Today, display apparatuses are incorporated into various new applications. In addition, the display apparatuses are becoming thinner and lighter, making it possible to use them in new ways.

A display apparatus may include a touch sensing device as an input device. The touch sensing device may include touch electrodes provided on a front surface of the display apparatus, a touch integrated circuit for driving the touch electrodes and sensing a touch, and a touch signal distribution unit for controlling a connection between the touch electrodes and the touch integrated circuit.

SUMMARY

One or more embodiments include a display apparatus which may reduce circuit defects caused by static electricity. However, the scope of the present disclosure is not limited thereto.

Additional aspects will be set forth in part in the description which follows and, in part, will be apparent from the description, or may be learned by practice of the presented embodiments of the disclosure.

According to one or more embodiments, a display apparatus includes a substrate including a display area and a peripheral area outside the display area, light-emitting diodes arranged in the display area, an electrode unit including electrode groups arranged on the light-emitting diodes, a touch driving pad arranged in the peripheral area, a touch signal distribution unit arranged in the peripheral area and electrically connected between the electrode unit and the touch driving pad, and a static electricity blocking unit electrically connected to the touch signal distribution unit and including organic diodes, wherein each of the organic diodes includes a first electrode, a second electrode arranged on the first electrode, and organic layer between the first electrode and the second electrode.

Each of the light-emitting diodes may further include a pixel electrode, an opposite electrode arranged on the pixel electrode, and an intermediate layer between the pixel electrode and the opposite electrode, and the first electrode and the pixel electrode may include the same material, and the second electrode and the opposite electrode may include the same material.

The organic layer and the intermediate layer may include the same material.

The intermediate layer may include a light-emitting layer, a first functional layer between the pixel electrode and the light-emitting layer, and a second functional layer between the opposite electrode and the light-emitting layer, and the organic layer may include the same material as at least one of the first functional layer and the second functional layer.

The organic diodes may include a first organic diode and a second organic diode, and a second electrode of the first organic diode may be electrically connected to a first voltage line, and a second electrode of the second organic diode may be electrically connected to a second voltage line, and a first voltage applied to the first voltage line may be greater than a second voltage applied to the second voltage line.

The static electricity blocking unit may further include rectifier transistors, and a second electrode of each of the organic diodes may be electrically connected to a first voltage line, and each of the rectifier transistors may include a semiconductor layer and a gate electrode on the semiconductor layer, wherein the semiconductor layer includes a source region, a drain region, and a channel region between the source region and the drain region, and the gate electrode may be electrically connected to the drain region, and the source region may be electrically connected to a second voltage line.

The first voltage applied to the first voltage line may be greater than a second voltage applied to the second voltage line.

The first voltage may include a gate high-level voltage, and the second voltage may include a gate low-level voltage.

The touch signal distribution unit may include a first demultiplexer and a second demultiplexer, the second demultiplexer configured to electrically connect the first demultiplexer to the touch driving pad, and the first demultiplexer may include sub-demultiplexers, and each of the sub-demultiplexers may be electrically connected to one of the electrode groups.

The second demultiplexer may be further configured to sequentially connect the sub-demultiplexers to the touch driving pad in response to first control signals.

The sub-demultiplexer connected to the touch driving pad may be configured to sequentially connect touch electrodes of a corresponding electrode group to the second demultiplexer in response to second control signals.

The static electricity blocking unit may include a first blocking unit and a second blocking unit arranged at two sides of the first demultiplexer.

The static electricity blocking unit may include a third blocking unit and a fourth blocking unit arranged at two sides of the second demultiplexer.

Each of the sub-demultiplexers may include first switching transistors, first connection wirings configured to electrically connect a first source-drain electrode of each of the first switching transistors to a corresponding touch electrode, and second connection wirings configured to connect a second source-drain electrode of each of the first switching transistors to the second demultiplexer.

The number of the first switching transistors may be the same as the number of touch electrodes of each of the electrode groups.

The second demultiplexer may include second switching transistors, third connection wirings configured to electrically connect a first source-drain electrode of each of the second switching transistors to a corresponding sub-demultiplexer, and fourth connection wirings configured to electrically connect a second source-drain electrode of each of the second switching transistors to the touch driving pad.

The number of the second switching transistors may be the same as the number of the sub-demultiplexers.

A first electrode of each of the organic diodes may be electrically connected to one of the first connection wirings, the second connection wirings, the third connection wirings, and the fourth connection wirings, and a second electrode of each of the organic diodes may be electrically connected to a first voltage line or a second voltage line.

A first electrode of each of the organic diodes may overlap one of the first connection wirings, the second connection wirings, the third connection wirings, and the fourth connection wirings in a plan view.

The first connection wirings, the second connection wirings, the third connection wirings, and the fourth connection wirings may extend in a first direction, and second electrodes of the organic diodes may be arranged along an imaginary straight line extending in a second direction crossing the first direction and may be integrally provided.

Other aspects, features, and advantages other than the above description will be clear from the details of the drawings, the claim of claims and the details of the invention.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
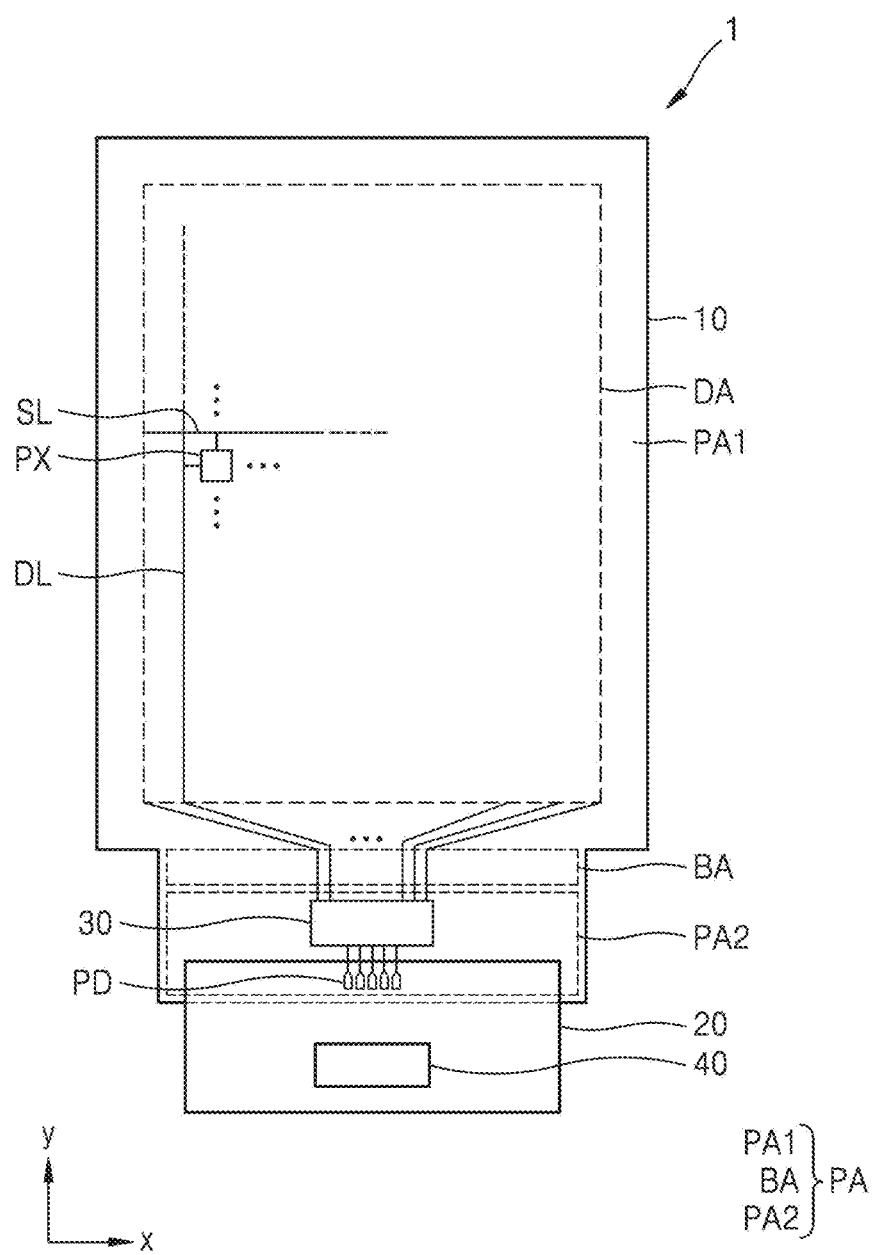
FIG. 1 is a plan view schematically illustrating a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

Since various modifications and various embodiments are possible, specific embodiments are illustrated in the drawings and described in detail in the detailed description. Effects and features of the disclosure, and a method of achieving them will be apparent with reference to embodiments described below in detail in conjunction with the drawings. However, the disclosure is not limited to the embodiments disclosed herein, but may be implemented in a variety of forms.

Hereinafter, embodiments will be described in detail with reference to the accompanying drawings, and the same or corresponding components are denoted by the same reference numerals, and the same reference numerals are assigned and redundant explanations will be omitted.

In the present specification, the terms of the first and second, etc. were used for the purpose of distinguishing one element from other element s, not a limited sense.

In the present specification, the singular expression includes a plurality of expressions unless the context is clearly different.

In the present specification, the terms such as comprising or having are meant to be the features described in the specification, or the element s are present, and the possibility of one or more other features or elements will be added, is not excluded in advance.

In the present specification, when a portion such as a layer, a region, an element or the like is on other portions, this is not only when the portion is on other elements, but also when other elements are interposed therebetween.

In the present specification, "A, B and/or C" may represent A, B, or C, or A and B, A and C, or B and C, or A, B, and C. "At least one of A, B, and C" may represent A, B, or C, or A and B, A and C, or B and C, or A, B, and C.

In the present specification, the x-axis, the y-axis, and the z-axis are not limited to three axes on a Cartesian coordinate system, and may be interpreted in a broad sense including the same. For example, the x-axis, the y-axis, and the z-axis may be perpendicular to each other, but may refer to different directions that are not orthogonal to each other.

In the present specification, in the case where some embodiments may be implemented in the present specification, a specific process order may be performed differently from the order described. For example, two processes described in succession may be substantially performed at the same time, or in an opposite order to an order to be described.

In the present specification, the case where a wiring "extends in a first direction or a second direction" refers to not only extending in a straight line shape, but also extending in a zigzag or curved shape along the first direction or the second direction.

In the present specification, when referred to as a "planar", it means when a target portion is viewed from above, and when referred to as a "cross-sectional view", it means when a cross section of the target portion cut vertically is viewed from a side. In the following embodiments, a first component that the first component "overlaps" a second component means that the first component is located at the top or bottom of the second component.

In the present specification, when X and Y are "connected to" each other, it may include the case where X and Y are electrically connected to each other, the case where X and Y are functionally connected to each other, and the case where X and Y are directly connected to each other. Here, X and Y may be objects (for example, devices, elements, circuits, wires, electrodes, terminals, conductive films, layers, etc.). Thus, the present disclosure is not limited to a predetermined connection relationship, for example, the connection relationship indicated in the drawings or the detailed description, and may also include other than the connection relationships indicated in the drawings or the detailed description.

When X and Y are electrically connected, for example, one or more elements (for example, switches, transistors, capacitive elements, inductors, resistance elements, diodes, etc.) enabling electrical connection of X and Y may be connected between X and Y.

In the present specification, "ON" used in association with a device state may refer to an activated state of an element, and "OFF" may refer to a deactivated state of the element. "ON" used in connection with a signal received by the element may refer to a signal activating the element, and "OFF" may refer to a signal deactivating the element. The element may be activated by a high-level voltage or a low-level voltage. For example, a P-channel transistor is activated by the low-level voltage, and an N-channel transistor is activated by the high-level voltage. Thus, it should be understood that "ON voltages for the P-channel transistor (P-type transistor) and the N-channel transistor (N-type transistor) have opposite (low versus high) voltage levels.

In the drawings, for convenience of explanation, the sizes of elements may be exaggerated or reduced. For example, since the size and thickness of each component shown in the drawings are arbitrarily indicated for convenience of explanation, the disclosure is not necessarily limited to the illustration.

Figure 2:
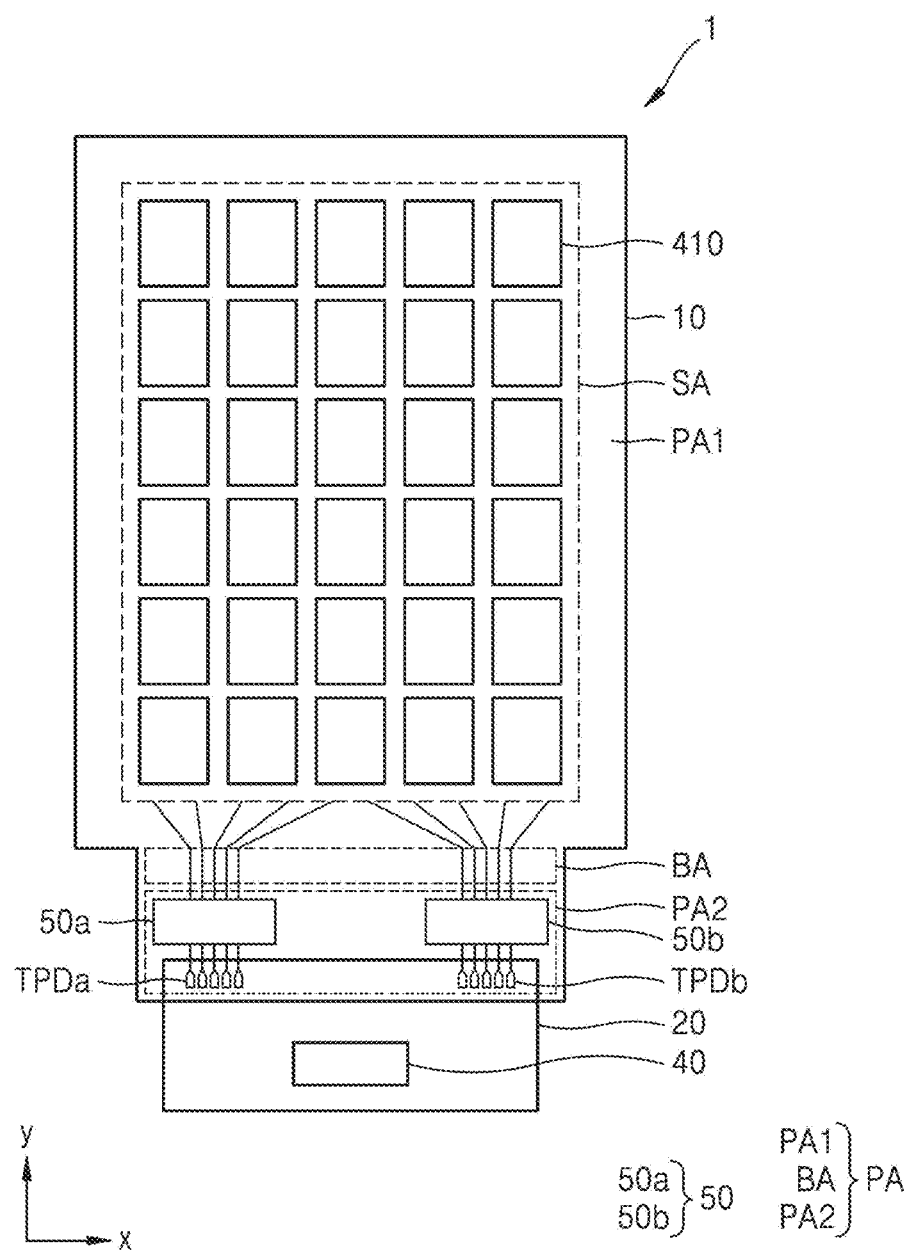
FIG. 2 is a plan view schematically illustrating a display apparatus according to an embodiment.

FIG. 1 is a plan view schematically illustrating a display apparatus according to an embodiment, and FIG. 2 is a plan view schematically illustrating the display apparatus according to an embodiment.

Referring to FIGS. 1 and 2, a display apparatus 1 may include a display panel 10 and a circuit board 20.

The display panel 10 may include a display area DA, in which images are displayed, and a peripheral area PA outside the display area DA. The display apparatus 1 may provide a certain image according to light emitted from a plurality of pixels PX arranged in the display area DA. The peripheral area PA may be an area outside the display area DA and may be a kind of non-display area in which the plurality of pixels PX are not arranged. The display area DA may be entirely surrounded by the peripheral area PA.

In an embodiment, as shown in FIGS. 1 and 2, the display area DA may have a long rectangular shape in a first direction (e.g., a y-axis direction). In another embodiment, the display area DA may have a long rectangular shape in a second direction (e.g., an x-axis direction). The display area DA may have a circular shape, an elliptical shape, a polygonal shape or an atypical shape.

Each of the plurality of pixels PX may include a display element such as an organic light-emitting diode, and a pixel circuit for controlling the display element. The pixel circuit may include a transistor, a storage capacitor, or the like. The pixel circuit may be electrically connected to data lines DL that extend in the first direction (e.g., the y-axis direction) and scan lines SL that extend in the second direction (e.g., the x-axis direction). The pixel circuit may be configured to control the display element in response to data signals transmitted through the data lines DL and scan signals transmitted through the scan lines SL. Each of the plurality of pixels PX may emit red, green, or blue light.

The display panel 10 may include a sensing area SA in which a user's touch input is sensed. Touch electrodes 410 may be arranged in the sensing area SA. In an embodiment, the display area DA and the sensing area SA may have substantially the same shape.

The peripheral area PA may include a first peripheral area PA1, a second peripheral area PA2, and a bending area BA. The first peripheral area PA1 may be an area surrounding the display area DA, and various wirings for transmitting electrical signals to the display area DA, and driving circuits may be arranged in the first peripheral area PA1. The second peripheral area PA2 may be at one side of the first peripheral area PA1, and a data driving unit 30 to which the circuit board 20 is attached, touch signal distribution units 50, pads PD, touch driving pads TPDa and TPDb, and wirings may be arranged in the second peripheral area PA2.

In an embodiment, the peripheral area PA may further include a bending area BA between the first peripheral area PA1 and the second peripheral area PA2. The bending area BA may be an area in which the display panel 10 is bent, and as the display panel 10 is bent, the second peripheral area PA2 may be on a rear surface of the display panel 10. Thus, the area of the non-display area seen by the user may be reduced.

The circuit board 20 may be a flexible printed circuit board. A controller 40 may be located on the circuit board 20. The controller 40 may include a plurality of integrated circuits, and some of the integrated circuits may be configured to generate electrical signals to be transmitted to the plurality of pixels PX or the driving circuits, and the other portions of the integrated circuits may be configured to generate electrical signals to be transmitted to the touch sensing device. The controller 40 may be mounted on the circuit board 20 by using a chip on plastic (COP) method or a chip on glass (COG) method.

The controller 40 may be electrically connected to the data driving unit 30 through the pads PD. The data driving unit 30 may be configured to convert image signals into data signals having voltage or current shapes in response to the control signals of the controller 40 and may be configured to transmit the data signals to the pixels PX through the data lines DL.

The controller 40 may be electrically connected to the touch signal distribution unit 50 through the touch driving pads TPDa and TPDb. The touch signal distribution unit 50 may selectively connect the touch electrodes 410 to the touch driving pads TPDa and TPDb in response to the control signals of the controller 40. The controller 40 may be configured to transmit the driving signals to the touch electrode 410, which are selectively connected to the touch driving pads TPDa and TPDb by the touch signal distribution unit 50, through wirings.

In an embodiment, the touch signal distribution unit 50 may include a first touch signal distribution unit 50a and a second touch signal distribution unit 50b. The first touch signal distribution unit 50a may be located on the left side (e.g., to the −x direction) of the data driving unit 30, and the second touch signal distribution unit 50b may be located on the right side (e.g., to the +x direction) of the data driving unit 30. In another embodiment, the touch signal distribution unit 50 may be arranged only at one side of the data driving unit 30.

Figure 3:
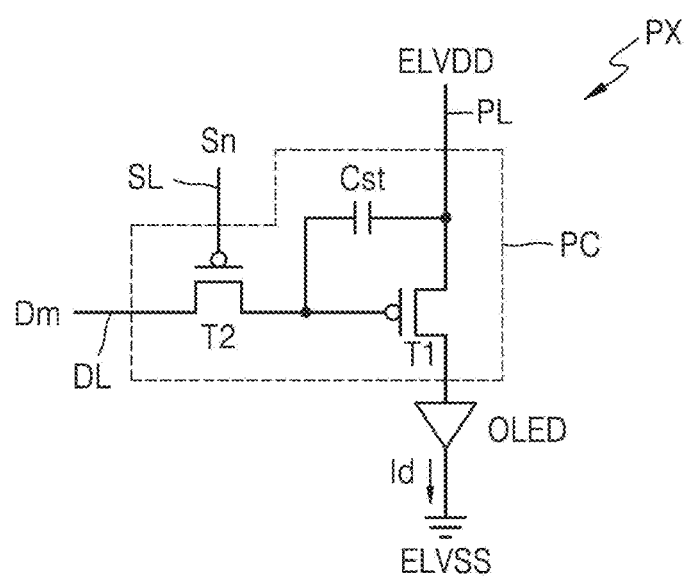
FIG. 3 is an equivalent circuit diagram of one pixel of a display apparatus according to an embodiment.

FIG. 3 is an equivalent circuit diagram of one pixel of a display apparatus according to an embodiment.

Referring to FIG. 3, the pixel PX may include a pixel circuit PC connected to the scan lines SL and the data lines DL, and a display element connected to the pixel circuit PC.

The display element may be an organic light-emitting diode OLED including a pixel electrode (an anode) and an opposite electrode (a cathode). The opposite electrode of the organic light-emitting diode OLED may be a common electrode to which a second power supply voltage ELVSS is applied.

The pixel circuit PC may include a first transistor T1, a second transistor T2, and a storage capacitor Cst. A first terminal of each of the first transistor T1 and the second transistor T2 may be a source or drain, and a second terminal of each of the first transistor T1 and the second transistor T2 may be a terminal different from the first terminal according to the type (a p-type or an n-type) of a transistor and/or operating conditions. For example, when the first terminal is a source, the second terminal may be a drain.

The first transistor T1 may be a driving transistor in which the magnitude of a driving current is determined in response to a gate-source voltage, and the second transistor T2 may be a switching transistor that is turned on/off in response to the gate-source voltage, substantially, a gate voltage. The first transistor T1 and the second transistor T2 may be thin-film transistors.

The first transistor T1 may be referred to as a driving transistor, and the second transistor T2 may be referred to a scan transistor.

The storage capacitor Cst may be connected between a power supply line PL and a gate of the first transistor T1. The storage capacitor Cst may have a second electrode connected to the power supply line PL and a first electrode connected to the gate of the first transistor T1. The storage capacitor Cst may store a voltage corresponding to a difference between a voltage transmitted from the second transistor T2 and a first power supply voltage ELVDD supplied to the power supply line PL.

The first transistor T1 may have a gate connected to the first electrode of the storage capacitor Cst, a first terminal connected to the power supply line PL, and a second terminal connected to the organic light-emitting diode OLED. The first transistor T1 may control the magnitude of a driving current Id that flows from the power supply line PL to the organic light-emitting diode OLED in response to the gate-source voltage. The organic light-emitting diode OLED may emit light having certain luminance by using the driving current Id.

The second transistor T2 may have a gate connected to the scan lines SL, a drain connected to the data lines DL and a source connected to the gate of the first transistor T1. The second transistor T2 may transmit data signals Dm to the gate of the first transistor T1 in response to the scan signals Sn.

Although FIG. 3 illustrates a pixel PX where the pixel circuit PC includes two thin-film transistors and one storage capacitor, this is just one of the possible embodiments and other configurations are possible. For example, the pixel circuit PC may include three or more transistors and/or two or more capacitors. In an embodiment, the pixel circuit PC may include three transistors and one storage capacitor. In yet another embodiment, the pixel circuit PC may include seven transistors and one storage capacitor.

Figure 4:
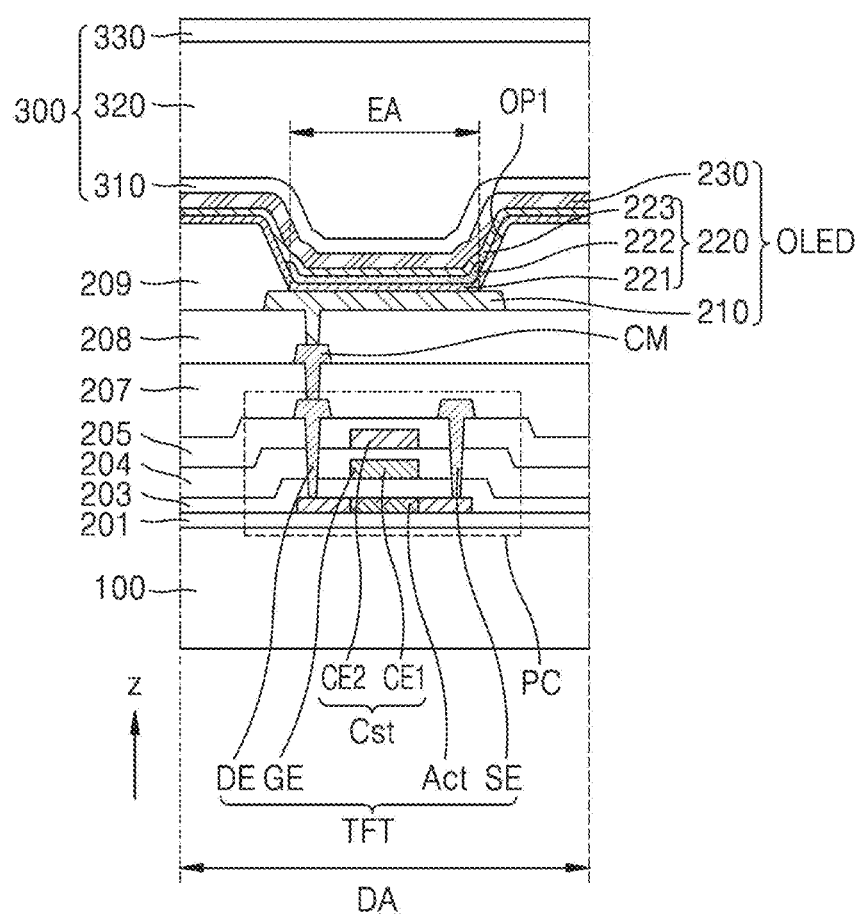
FIG. 4 is a cross-sectional view schematically illustrating a display apparatus according to an embodiment.

FIG. 4 is a cross-sectional view schematically illustrating a display apparatus according to an embodiment.

Referring to FIG. 4, the display panel 10 may include a substrate 100, a display element layer, and an encapsulation layer 300. The organic light-emitting diode OLED and the pixel circuit PC electrically connected to the organic light-emitting diode OLED may be arranged on the display element layer.

The substrate 100 may include an insulating material such as glass, quartz, a polymer resin, or the like. The substrate 100 may be a rigid substrate or a flexible substrate that may be bent, folded or rolled. For example, the substrate 100 may include a polymer resin, such as polyether sulfone, polyacrylate, polyether imide, polyethylene naphthalate, polyethylene terephthalate, polyphenylene sulfide, polyarylate, polyimide, polycarbonate, or cellulose acetate propionate. The substrate 100 may have a multi-layered structure including a layer including the above-described polymer resin and an inorganic layer (not shown). For example, the substrate 100 may have a multi-layered structure in which layers including polymer resin and inorganic barrier layers are alternately stacked.

Since the display panel 10 includes the display area DA and the peripheral area (see PA of FIG. 1), the substrate 100 may include a region corresponding to the display area DA and a region corresponding to the peripheral area PA. Here, the substrate 100 including the display area DA and the peripheral area PA represents that the substrate 100 includes a region corresponding to the display area DA and a region corresponding to the peripheral area PA.

A buffer layer 201 may be located on the substrate 100, and may reduce or prevent penetration of foreign substances, moisture or external air from the lower portion of the substrate 100. Additionally, the buffer layer 201 may provide a flat surface for the semiconductor layer Act. The buffer layer 201 may include an inorganic material such as oxide or nitride, an organic material, or an organic/inorganic composite material, and may have a single layer or multi-layered structure of the inorganic material and the organic material.

A barrier layer for preventing penetration of external air may be further arranged between the substrate 100 and the buffer layer 201. The barrier layer and the buffer layer 201 may include silicon oxide ($SiO_2$) or silicon nitride ($SiN_x$).

The pixel circuit PC including the thin-film transistor TFT and the storage capacitor Cst may be arranged on the buffer layer 201. The thin-film transistor TFT may correspond to the first transistor T1 described with reference to FIG. 3.

The thin-film transistor TFT may include a semiconductor layer Act, a gate electrode GE, a drain electrode DE, and a source electrode SE.

The semiconductor layer Act may be disposed on the buffer layer 201 and may include polysilicon. In another embodiment, the semiconductor layer Act may include amorphous silicon. In yet another embodiment, the semiconductor layer Act may include oxide of at least one material selected from the group consisting of indium (In), gallium (Ga), stannum (Sn), zirconium (Zr), vanadium (V), hafnium (Hf), cadmium (Cd), germanium (Ge), chromium (Cr), titanium (Ti), and zinc (Zn). The semiconductor layer Act may include a channel region, and a source region and a drain region doped with impurities. The source region and the drain region may be on the two sides of the channel region, respectively.

A first gate insulating layer 203 may be provided to cover the semiconductor layer Act. The first gate insulating layer 203 may include an inorganic insulating material such as silicon oxide ($SiO_x$), silicon nitride ($SiN_x$), silicon oxynitride ($SiO_xN_y$), aluminum oxide ($Al_2O_3$), titanium oxide ($TiO_2$), tantalum oxide ($Ta_2O_5$), hafnium oxide ($HfO_2$), or zinc oxide ($ZnO_2$). The first gate insulating layer 203 may have a single layer or multi-layered structure including the above-described inorganic insulating materials.

A gate electrode GE may be arranged on the first gate insulating layer 203 to overlap the semiconductor layer Act.

The gate electrode GE may have a single layer or multi-layered structure including molybdenum (Mo), Al, Cu, Ti, and the like. For example, the gate electrode GE may have a single layer structure of Mo.

The second gate insulating layer 204 may be provided to cover the gate electrode GE. The second gate insulating layer 204 may include an inorganic insulating material such as silicon oxide ($SiO_x$), silicon nitride ($SiN_x$), silicon oxynitride ($SiO_xN_y$), aluminum oxide ($Al_2O_3$), titanium oxide ($TiO_2$), tantalum oxide ($Ta_2O_5$), hafnium oxide ($HfO_2$), or zinc oxide ($ZnO_2$). The second gate insulating layer 204 may have a single layer or multi-layered structure including the above-described inorganic insulating materials.

A second electrode CE2 of the storage capacitor Cst may be arranged above the second gate insulating layer 204. The second electrode CE2 may overlap the gate electrode GE. The gate electrode GE and the second electrode CE2 may overlap each other with the second gate insulating layer 204 therebetween and may constitute the storage capacitor Cst. That is, the gate electrode GE may function as a first electrode CE1 of the storage capacitor Cst.

The second electrode CE2 may include aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and/or copper (Cu), and may have a single layer or multi-layered structure including the materials described above.

An interlayer insulating layer 205 may be provided to cover the second electrode CE2. The interlayer insulating layer 205 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The interlayer insulating layer 205 may have a single layer or multi-layered structure including the above-described inorganic insulating materials.

The source electrode SE and the drain electrode DE may be arranged on the interlayer insulating layer 205. The source electrode SE and the drain electrode DE may include a conductive material including Mo, Al, Cu, Ti, or the like, and may have a multi-layered or single layer structure including the materials described above. For example, the source electrode SE and/or the drain electrode DE may have a three-layer structure of Ti/Al/Ti. In some embodiments, the source electrode SE or the drain electrode DE may also be omitted. For example, adjacent thin-film transistors TFT may share the source region and the drain region of the semiconductor layer Act, and the source region or the drain region may function as the source electrode SE or the drain electrode DE.

A first planarization insulating layer 207 may be arranged to cover the source electrode SE and the drain electrode DE, and a second planarization insulating layer 208 may be arranged on the first planarization insulating layer 207. The first planarization insulating layer 207 and the second planarization insulating layer 208 may provide a flat base surface to the pixel electrode 210 arranged above the first planarization insulating layer 207 and the second planarization insulating layer 208.

The first planarization insulating layer 207 and the second planarization insulating layer 208 may include organic materials and may have a single layer or multi-layered structure. The organic materials may include a general common use polymer such as benzocyclobutene (BCB), polyimide, hexamethyldisiloxane (HMDSO), polymethylmethacrylate (PMMA) or polystyrene (PS), a polymer derivative having a phenol-based group, an acryl-based polymer, an imide-based polymer, an aryl ether-based polymer, an amide-based polymer, a fluorine-based polymer, a p-xylene-based polymer, or a vinyl alcohol-based polymer, or the like. The first planarization insulating layer 207 and the second planarization insulating layer 208 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_2$). When the first planarization insulating layer 207 and the second planarization insulating layer 208 are formed, in order to provide flat upper surfaces after layers are formed, chemical mechanical polishing may be performed on upper surfaces of the layers.

A connection electrode CM may be arranged between the first planarization insulating layer 207 and the second planarization insulating layer 208. The connection electrode CM may include a conductive material including Mo, Al, Cu, Ti, or the like, and may have a multi-layered or single layer structure including the materials described above. The connection electrode CM may be electrically connected to the drain electrode DE of the thin-film transistor TFT through a contact hole passing through the first planarization insulating layer 207.

A pixel electrode 210 may be arranged above the second planarization insulating layer 208. The pixel electrode 210 may be electrically connected to the thin-film transistor TFT by being in contact with the connection electrode CM through a contact hole passing through the second planarization insulating layer 208.

The pixel electrode 210 may include a transparent conductive oxide such as indium tin oxide (ITO), indium zinc oxide (IZO), zinc oxide (ZnO), indium oxide ($In_2O_3$), indium gallium oxide (IGO), or aluminum zinc oxide (AZO). The pixel electrode 210 may include a reflective layer including Ag, Mg, Al, Pt, Pd, Au, Ni, Nd, Ir, Cr, or a compound thereof. For example, the pixel electrode 210 may have a structure having layers formed of ITO, IZO, ZnO or $In_2O_3$ on/under the above-described reflective layer. In this case, the pixel electrode 210 may have a stack structure of ITO/Ag/ITO.

A pixel-defining layer 209 may cover edges of the pixel electrode 210 on the second planarization insulating layer 208 and may include a pixel opening OP1 for exposing the center of the pixel electrode 210. A light-emitting region EA of the organic light-emitting diode OLED, i.e., the size and shape of a pixel is defined by the pixel opening OP1.

The pixel-defining layer 209 may be configured to increase a distance between edges of the pixel electrode 210 and the opposite electrode 230 on the pixel electrode 210 to prevent arc etc. from occurring in the edges of the pixel electrode 210. The pixel-defining layer 209 may be formed of an organic insulating material such as polyimide, polyamide, acryl resin, BCB, HMDSO, a phenol resin, or the like through a method such as spin coating or the like.

The pixel-defining layer 209 may be colored black. The pixel-defining layer 209 may include a light blocking material and may be colored black. The light blocking material may include carbon black, carbon nanotubes, a resin or paste including a black dye, metal particles, such as Ni, Al, Mo and alloys thereof, metal oxide particles (e.g., chromium oxide), or metal nitride particles (e.g., chromium nitride). When the pixel-defining layer 209 includes a light blocking material, external light reflection caused by metal structures located under the pixel-defining layer 209 may be reduced.

An intermediate layer 220 may be arranged between the pixel electrode 210 and the opposite electrode 230. The intermediate layer 220 may include a first functional layer 221, a light-emitting layer 222, and a second functional layer 223.

The light-emitting layer 222 formed to correspond to the pixel electrode 210 may be arranged inside the pixel opening OP1 of the pixel-defining layer 209. The light-emitting layer 222 may include a polymer material or low molecular weight material, and may emit red, green blue or white light.

The first functional layer 221 may be arranged between the pixel electrode 210 and the light-emitting layer 222, and the second functional layer 223 may be arranged between the light-emitting layer 222 and the opposite electrode 230. In an embodiment, unlike the light-emitting layer 222 patterned and arranged in each pixel, the first functional layer 221 and the second functional layer 223 may be integrally provided over the display area DA.

The first functional layer 221 may be a single layer or multiple layers. For example, when the first functional layer 221 includes a polymer material, the first functional layer 221 may be a hole transport layer (HTL) having a single layer structure and may include poly-(3,4)-ethylene-dihydroxy thiophene (PEDOT) or polyaniline (PANI). When the first functional layer 221 includes a low molecular weight material, the first functional layer 221 may include a hole injection layer (HIL) and a HTL.

The second functional layer 223 may be selectively arranged. For example, when the first functional layer 221 and the light-emitting layer 222 include polymer materials, the second functional layer 223 may be formed. The second functional layer 223 may be a single layer or multiple layers. The second functional layer 223 may include an electron transport layer (ETL) and/or an electron injection layer (EIL). In some embodiments, at least one of a HIL, a HTL, an ETL, and an EIL may also be omitted.

The opposite electrode 230 may include a conductive material having a comparatively low work function. For example, the opposite electrode 230 may include a (semi-) transparent layer including silver (Ag), magnesium (Mg), aluminum (Al), nickel (Ni), chromium (Cr), lithium (Li), calcium (Ca) or an alloy thereof. Alternatively, the opposite electrode 230 may further include a layer such as ITO, IZO, ZnO or $In_2O_3$ on the (semi-) transparent layer including the above-described materials. In an embodiment, the opposite electrode 230 may include Ag and Mg.

The stack structure of the pixel electrode 210, the intermediate layer 220 and the opposite electrode 230 that are sequentially stacked may constitute the organic light-emitting diode OLED.

In an embodiment, a capping layer (not shown) may be arranged on the organic light-emitting diode OLED. The capping layer may be configured to improve the light-emitting efficiency of the organic light-emitting diode OLED by the principle of reinforcement interference. The capping layer may be an organic capping layer including an organic material, an inorganic capping layer including an inorganic material, or a composite capping layer including an organic material and an inorganic material.

An encapsulation layer 300 may be arranged on the organic light-emitting diode OLED. In an embodiment, the encapsulation layer 300 may include at least one inorganic encapsulation layer and at least one organic encapsulation layer. In an embodiment, the encapsulation layer 300 may include first and second inorganic encapsulation layers 310 and 330 and an organic encapsulation layer 320 therebetween.

Each of the first inorganic encapsulation layer 310 and the second inorganic encapsulation layer 330 may include one or more inorganic insulating materials. The inorganic insulating materials may include aluminum oxide ($Al_2O_3$), titanium oxide ($TiO_2$), tantalum oxide ($Ta_2O_5$), hafnium oxide ($HfO_2$), zinc oxide (ZnO), silicon oxide ($SiO_x$), silicon nitride ($SiN_x$), or/and silicon oxynitride (SiON). The first inorganic encapsulation layer 310 and the second inorganic encapsulation layer 330 may be formed through chemical vapor deposition.

The organic encapsulation layer 320 may further include polyethylene terephthalate, polyethylene naphthalate, polycarbonate, polyimide, polyethylene sulfonate, polyoxymethylene, polyarylate, hexamethyldisiloxane (HMDSO), acryl-based resin or a combination thereof.

The encapsulation layer 300 may entirely cover the display area DA, may extend to the peripheral area (see PA of FIG. 1), and may be arranged to cover at least a part of the peripheral area PA.

In an embodiment, electrode units of the touch sensing device may be arranged on the encapsulation layer 300. The encapsulation layer 300 may include the organic encapsulation layer 320, as described above, and may provide a further-planarized base surface. Thus, even when the electrode units of the touch sensing device and the wirings are formed through a continuous process, defective rates may be reduced.

Figure 5:
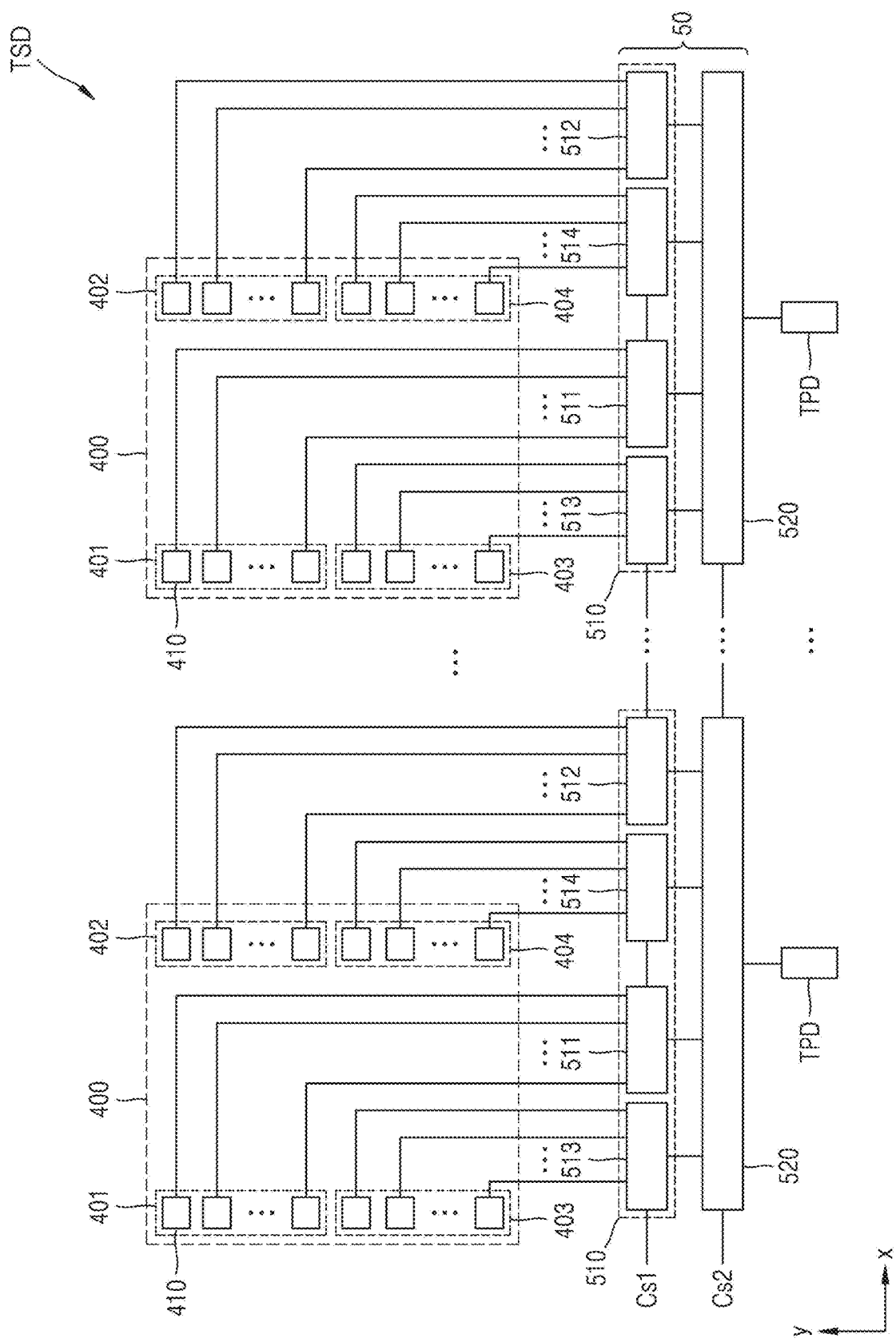
FIG. 5 is a diagram schematically illustrating a touch sensing device of a display apparatus according to an embodiment.

FIG. 5 is a diagram schematically illustrating a touch sensing device of a display apparatus according to an embodiment.

Referring to FIG. 5, a touch sensing device TSD according to an embodiment may include electrode units 400 arranged in the sensing area (see SA of FIG. 2), a touch signal distribution unit 50, touch driving pads TPD, and connection wirings for connecting the components.

One electrode unit 400 may include touch electrodes 410 electrically connected to one touch driving pad TPD. The electrode unit 400 may include a plurality of electrode groups. As shown in FIG. 5, the electrode unit 400 may include a first electrode group 401, a second electrode group 402, a third electrode group 403, and a fourth electrode group 404.

Each of the electrode groups 401, 402, 403, and 404 may include a plurality of touch electrodes 410. In an embodiment, the touch electrodes 410 that belong to the same electrode group may be arranged to be spaced apart from one another in the first direction (e.g., the y-axis direction).

The first electrode group 401 and the third electrode group 403 may be arranged adjacent to each other in the first direction (e.g., the y-axis direction), and the second electrode group 402 and the fourth electrode group 404 may be arranged adjacent to each other in the first direction (e.g., the y-axis direction). The first electrode group 401 and the second electrode group 402 may be arranged adjacent to each other in the second direction (e.g., the x-axis direction), and the third electrode group 403 and the fourth electrode group 404 may be arranged adjacent to each other in the second direction (e.g., the x-axis direction). For example, the touch electrodes 410 may form a matrix in the first direction (e.g., the y-axis direction) and the second direction (e.g., the x-axis direction), and the first electrode group 401 and the third electrode group 403 may be arranged in an odd-numbered column, and the second electrode group 402 and the fourth electrode group 404 may be arranged in an even-numbered column.

The touch signal distribution unit 50 may be electrically connected between the electrode unit 400 and the touch driving pad TPD. The touch signal distribution unit 50 may be configured to sequentially connect the touch electrodes 410 belonging to one electrode unit 400 to the touch driving pad TPD in response to control signals. The touch signal distribution unit 50 may include first demultiplexers 510 and second demultiplexers 520.

The first demultiplexers 510 may be electrically connected to the touch electrodes 410 of the electrode unit 400 through the connection wiring. Each of the first demultiplexers 510 may include a plurality of sub-demultiplexers 511, 512, 513, and 514. Each of the plurality of sub-demultiplexers 511, 512, 513, and 514 may be electrically connected to one of the electrode groups 401, 402, 403, and 404. Thus, the number of the sub-demultiplexers 511, 512, 513, and 514 may be the same as the number of the electrode groups 401, 402, 403, and 404 included in one electrode unit 400.

In an embodiment, the first sub-demultiplexer 511 may be electrically connected to the touch electrodes 410 of the first electrode group 401 through the connection wiring, the second sub-demultiplexer 512 may be electrically connected to the touch electrodes 410 of the second electrode group 402 through the connection wiring, the third sub-demultiplexer 513 may be electrically connected to the touch electrodes 410 of the third electrode group 403 through the connection wiring, and the fourth sub-demultiplexer 514 may be electrically connected to the touch electrodes 410 of the fourth electrode group 404 through the connection wiring.

Each of the sub-demultiplexers 511, 512, 513, and 514 may be configured to sequentially connect each of the touch electrodes 410 of an electrode group to the second demultiplexer 520 in response to a first control signal Cs1.

The second demultiplexer 520 may be arranged between the first demultiplexer 510 and the touch driving pad TPD and may electrically connect the first demultiplexer 510 to the touch driving pad TPD. The second demultiplexer 520 may be configured to electrically connect each of the sub-demultiplexers 511, 512, 513, and 514 to the touch driving pad TPD in response to a second control signal Cs2 in sequence.

In an embodiment, the second demultiplexer 520 may be configured to electrically connect the first sub-demultiplexer 511 to the touch driving pad TPD for a first period, to electrically connect the second sub-demultiplexer 512 to the touch driving pad TPD for a second period, to electrically connect the third sub-demultiplexer 513 to the touch driving pad TPD for a third period, and to electrically connect the fourth sub-demultiplexer 514 to the touch driving pad TPD for a fourth period.

For the first period, the first sub-demultiplexer 511 may be configured to sequentially electrically connect each of the touch electrodes 410 of the first electrode group 401 to the touch driving pad TPD. For the second period, the second sub-demultiplexer 512 may be configured to sequentially electrically connect each of the touch electrodes 410 of the second electrode group 402 to the touch driving pad TPD. For the third period, the third sub-demultiplexer 513 may be configured to sequentially electrically connect each of the touch electrodes 410 of the third electrode group 403 to the touch driving pad TPD. For the fourth period, the fourth sub-demultiplexer 514 may be configured to sequentially electrically connect each of the touch electrodes 410 of the fourth electrode group 404 to the touch driving pad TPD Thus, driving signals supplied to the touch driving pad TPD by the controller (see 40 of FIG. 2) may be time-divisionally transmitted to each of the touch electrodes 410 by the touch signal distribution unit 50.

Figure 6:
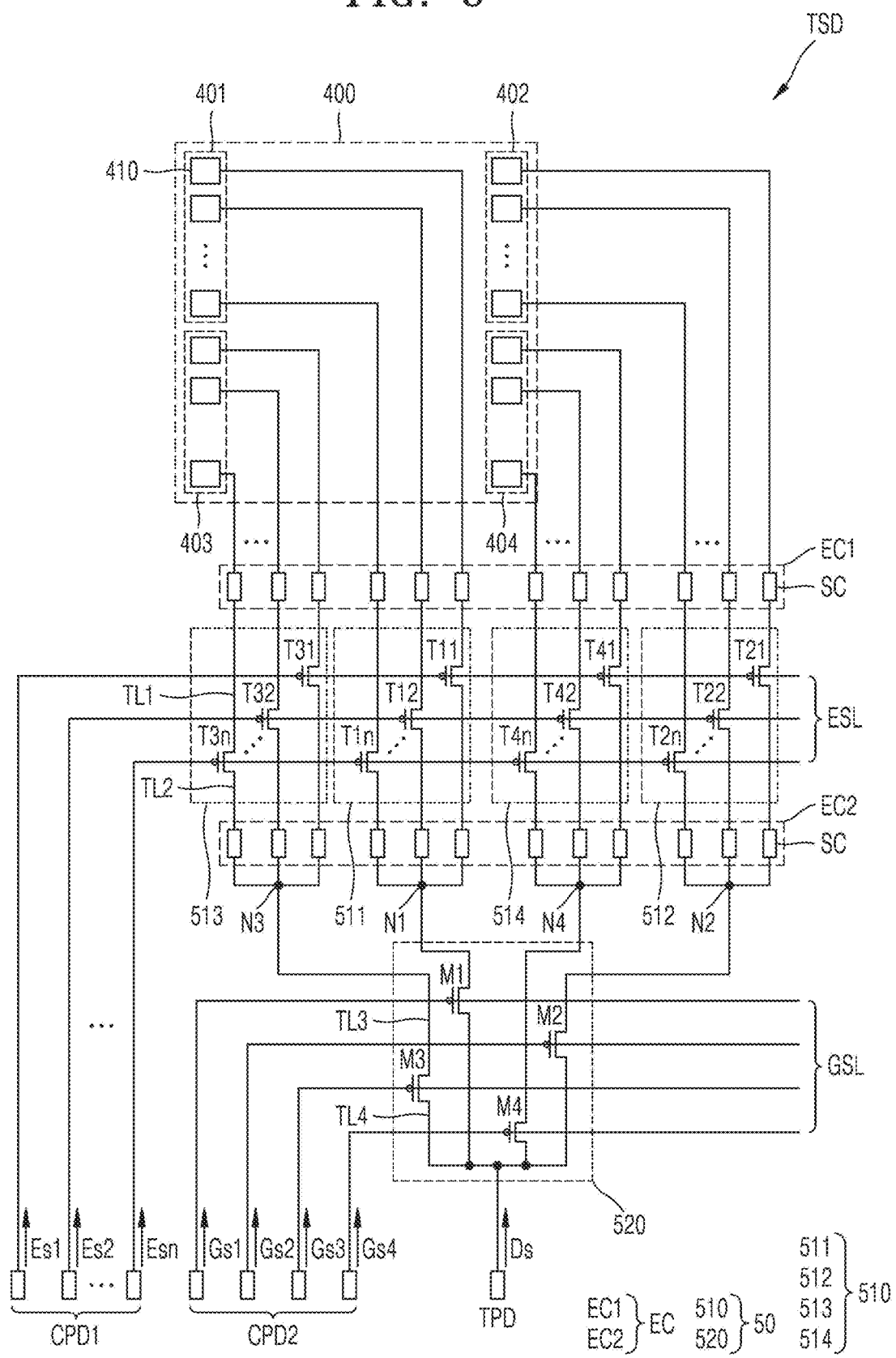
FIG. 6 is a diagram schematically illustrating a circuit of one touch sensing device according to an embodiment.

FIG. 6 is a diagram schematically illustrating a circuit of one touch sensing device according to an embodiment.

Referring to FIG. 6, a touch sensing device TSD may include an electrode unit 400, a touch signal distribution unit 50, a touch driving pad TPD, connection wirings TL1, TL2, TL3, and TL4, and control signals lines ESL and GSL.

The electrode unit 400 may include electrode groups 401, 402, 403, and 404. The electrode groups 401, 402, 403, and 404 may include a first electrode group 401, a second electrode group 402, a third electrode group 403, and a fourth electrode group 404. Each of the electrode groups 401, 402, 403, and 404 may include a plurality of touch electrodes 410.

The touch signal distribution unit 50 may be arranged between the electrode unit 400 and the touch driving pad TPD. The touch signal distribution unit 50 may include first demultiplexers 510 and second demultiplexers 520. Each of the first demultiplexers 510 may include a plurality of sub-demultiplexers 511, 512, 513, and 514. The plurality of sub-demultiplexers 511, 512, 513, and 514 may include a first sub-demultiplexer 511, a second sub-demultiplexer 512, a third sub-demultiplexer 513, and a fourth sub-demultiplexer 514.

The first demultiplexer 510 may include a plurality of first switching transistors T11, . . . , and T4n, first connection wirings TL1, second connection wirings TL2, and first control signal lines ESL. The number of the first switching transistors T11, . . . , and T4n of each of the sub-demultiplexers 511, 512, 513, and 514 may be the same as the number of the touch electrodes 410 of an electrode group to which each of the sub-demultiplexers 511, 512, 513 and 514 is connected.

In an embodiment, the first electrode group 401 may include n touch electrodes 410, and the first sub-demultiplexer 511 may include n first switching transistors T11, T12, . . . , and T1n. A first terminal of each of the first switching transistors T11, T12, . . . , and T1n of the first sub-demultiplexer 511 may be one-to-one connected to the touch electrodes 410 of the first electrode group 401 through the first connection wirings TL1. A second terminal of each of the first switching transistors T11, T12, . . . , and T1n may be electrically connected to the second connection wirings TL2. The second connection wirings TL2 of the first sub-demultiplexer 511 may join in a first node N1 and may be electrically connected to the second demultiplexer 520.

Similarly, the second sub-demultiplexer 512 may include n first switching transistors T21, T22, . . . , and T2n. A first terminal of each of the first switching transistors T21, T22, . . . and T2n of the second sub-demultiplexer 512 may be one-to-one connected to the touch electrodes 410 of the second electrode group 402 through the first connection wirings TL1. A second terminal of each of the first switching transistors T21, T22, . . . , and T2n may be electrically connected to the second connection wirings TL2. The second connection wirings TL2 of the second sub-demultiplexer 512 may join in a second node N2 and may be electrically connected to the second demultiplexer 520.

The third sub-demultiplexer 513 may include n first switching transistors T31, T32, . . . , and T3n. A first terminal of each of the first switching transistors T31, T32, . . . , and T3n of the third sub-demultiplexer 513 may be one-to-one connected to the touch electrodes 410 of the third electrode group 403 through the first connection wirings TL1. A second terminal of each of the first switching transistors T31, T32, . . . , and T3n may be electrically connected to the second connection wirings TL2. The second connection wirings TL2 of the third sub-demultiplexer 513 may join in a third node N3 and may be electrically connected to the second demultiplexer 520.

The fourth sub-demultiplexer 514 may include n first switching transistors T41, T42, . . . , and T4n. A first terminal of each of the first switching transistors T41, T42, . . . , and T4n of the fourth sub-demultiplexer 514 may be one-to-one connected to one of the touch electrodes 410 of the fourth electrode group 404 through the first connection wirings TL1. A second terminal of each of the first switching transistors T41, T42, . . . , and T4n may be electrically connected to the second connection wirings TL2. The second connection wirings TL2 of the fourth sub-demultiplexer 514 may join in a fourth node N4 and may be electrically connected to the second demultiplexer 520.

A gate of each of the first switching transistors T11, T12, . . . , and T4n may be electrically connected to one of the first control signal lines ESL. The first control signal lines ESL may be configured to transmit first control signals Es1, Es2, . . . , and Esn applied through first control pads CPD1 to a gate of the first switching transistors T11, . . . , and T4n. The first switching transistors T11, . . . , and T4n may be turned on or turned off in response to the first control signals Es1, Es2, . . . , and Esn.

Thus, each of the sub-demultiplexers 511, 512, 513, and 514 may be configured to sequentially connect the touch electrodes 410 of a corresponding electrode group to the second demultiplexer 520 in response to the first control signals Es1, Es2, . . . , and Esn.

The second demultiplexer 520 may include a plurality of second switching transistors M1, M2, M3, and M4, third connection wirings TL3, fourth connection wirings TL4, and second control signal lines GSL. The number of the second switching transistors M1, M2, M3, and M4 of the second demultiplexer 520 may be the same as the number of the sub-demultiplexers 511, 512, 513, and 514 of the first demultiplexer 510. In other words, the number of the second switching transistors M1, M2, M3, and M4 of the second demultiplexer 520 may be the same as the number of the electrode groups 401, 402, 403, and 404 of the electrode unit 400.

In an embodiment, the second demultiplexer 520 may include four second switching transistors M1, M2, M3, and M4. A first terminal of each of the second switching transistors M1, M2, M3, and M4 may be one-to-one connected to the nodes N1, N2, N3, and N4 through the third connection wirings TL3. A second terminal of each of the second switching transistors M1, M2, M3, and M4 may be electrically connected to the fourth connection wirings TL4. The fourth connection wirings TL4 may join in each other and may be electrically connected to the touch driving pad TPD.

A gate of each of the second switching transistors M1, M2, M3, and M4 may be electrically connected to one of the second control signal lines GSL. The second control signal lines GSL may be configured to transmit the second control signals Gs1, Gs2, Gs3, and Gs4 applied through the second control pads CPD2 to gates of the second switching transistors M1, M2, M3, and M4. The second switching transistors M1, M2, M3, and M4 may be turned on or turned off in response to the second control signals Gs1, Gs2, Gs3, and Gs4. Thus, the second demultiplexer 520 may be configured to sequentially connect the sub-demultiplexers 511, 512, 513, and 514 to the touch driving pad TPD in response to the second control signal Gs1, Gs2, Gs3, and Gs4.

The touch sensing device TSD may include a static electricity blocking unit EC. The static electricity blocking unit EC may include protection circuits SC for protecting transistors of the touch signal distribution unit 50 from damage by high-voltage pulse.

In an embodiment, the static electricity blocking unit EC may include a first blocking unit EC1 and a second blocking unit EC2 arranged at two sides of the first demultiplexer 510. Each of the first blocking unit EC1 and the second blocking unit EC2 may include a plurality of protection circuits SC. The first blocking unit EC1 may be electrically connected to the first connection wirings TL1 of the first demultiplexer 510, and the second blocking unit EC2 may be electrically connected to the second connection wirings TL2 of the first demultiplexer 510. In another embodiment, the second blocking unit EC2 may be arranged between the nodes N1, N2, N3, and N4 and the second demultiplexer 520.

Figure 7:
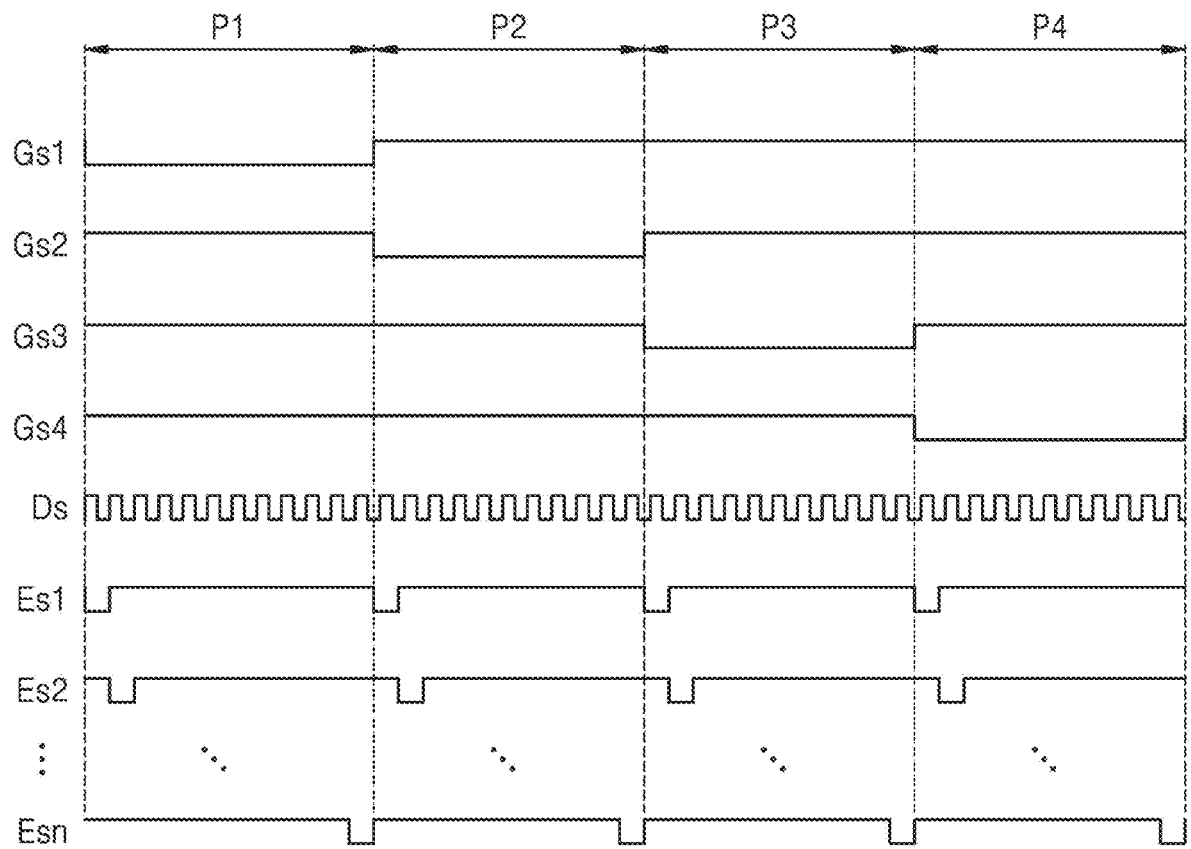
FIG. 7 is a timing diagram illustrating a driving method of the touch sensing device shown in FIG. 6.

FIG. 7 is a timing diagram illustrating a driving method of the touch sensing device shown in FIG. 6.

Referring to FIGS. 6 and 7, the first control signals Es1, Es2, . . . , and Esn may be supplied to the first demultiplexer 510 through the first control signal lines ESL from the controller (see 40 of FIG. 2). The first control signals Es1, Es2, . . . , and Esn may be gate control signals controlling turn-on and turn-off of the first switching transistors T11, . . . , and T4n. The first control signals Es1, Es2, . . . , and Esn may be supplied as an on voltage at which each of the first switching transistors T11, . . . , and T4n may be turned on, and an off voltage at which each of the first switching transistors T11, . . . , and T4n may be turned off. The first control signals Es1, Es2, . . . , and Esn may be signals having the same waveform and shifted phase. A period (hereinafter, referred to as an "on voltage period") for which an on voltage of each of the first control signals Es1, Es2, . . . , and Esn is maintained, may sequentially come and may not overlap each other.

The second control signals Gs1, Gs2, Gs3, and Gs4 may be supplied to the second demultiplexer 520 through the second control signal lines GSL from the controller (see 40 of FIG. 2). The second control signals Gs1, Gs2, Gs3, and Gs4 may be gate control signals for controlling turn-on and turn-off of the second switching transistors M1, M2, M3, and M4 of the second demultiplexer 520. The second control signals Gs1, Gs2, Gs3, and Gs4 may be supplied as an on voltage at which each of the second switching transistors M1, M2, M3, and M4 may be turned on, and an off voltage at which each of the second switching transistors M1, M2, M3, and M4 may be turned off. The second control signals Gs1, Gs2, Gs3, and Gs4 may have the same waveform and shifted phase. For example, a (2-1)-th control signal Gs1 may be supplied as an on voltage for a first period P1 and may be supplied as an off voltage for a second period P2, a third period P3, and a fourth period P4. A (2-2)-th control signal Gs2 may be supplied as an on voltage for the second period P2 and may be supplied as an off voltage for the first period P1, the third period P3, and the fourth period P4. A (2-3)-th control signal Gs3 may be supplied as an on voltage for the third period P3 and may be supplied as an off voltage for the first period P1, the second period P2, and the fourth period P4. A (2-4)-th control signal Gs4 may be supplied as an on voltage for the fourth period P4 and may be supplied as an off voltage for the first period P1, the second period P2, and the third period P3.

For example, the first period P1 may be an on voltage period of the (2-1)-th control signal Gs1, the second period P2 may be an on voltage period of the (2-2)-th control signal Gs2, and the third period P3 may be an on voltage period of the (2-3)-th control signal Gs3, and the fourth period P4 may be an on voltage period of the (2-4)-th control signal Gs4. The first through fourth periods P1, P2, P3, and P4 may be sequentially repeated.

For the first through fourth periods P1, P2, P3, and P4, the driving signal Ds may be supplied to the touch driving pad TPD. The driving signal Ds may have a square wave signal in which a high level voltage and a low level voltage are repeated.

The (2-1)-th switching transistor M1 of the second demultiplexer 520 may be turned on by the (2-1)-th control signal Gs1 for the first period P1. The driving signal Ds may be transmitted to the first node N1 through the (2-1)-th switching transistor M1.

The first switching transistors T11, T12, ..., and T1$n$ of the first sub-demultiplexer 511 may be sequentially turned on in response to the first control signals Es1, Es2, ..., and Es$n$ for the first period P1. Thus, the touch electrodes 410 included in the first electrode group 401 may be activated by sequentially receiving the driving signal Ds.

The (2-2)-th switching transistor M2 of the second demultiplexer 520 may be turned on by the (2-2)-th control signal Gs2 for the second period P2. The driving signal Ds may be transmitted to the second node N2 through the (2-2)-th switching transistor M2.

The first switching transistors T21, T22, ..., and T2$n$ of the second sub-demultiplexer 512 may be sequentially turned on in response to the first control signals Es1, Es2, ..., and Es$n$ for the second period P2. Thus, the touch electrodes 410 included in the second electrode group 402 may be activated by sequentially receiving the driving signal Ds.

The (2-3)-th switching transistor M3 of the second demultiplexer 520 may be turned on by the (2-3)-th control signal Gs3 for the third period P3. The driving signal Ds may be transmitted to the third node N3 through the (2-3)-th switching transistor M3.

The first switching transistors T31, T32, ..., and T3$n$ of the third sub-demultiplexer 513 may be sequentially turned on in response to the first control signals Es1, Es2, ..., and Es$n$ for the third period P3. Thus, the touch electrodes 410 included in the third electrode group 403 may be activated by sequentially receiving the driving signal Ds.

The (2-4)-th switching transistor M4 of the second demultiplexer 520 may be turned on by the (2-4)-th control signal Gs4 for the fourth period P4. The driving signal Ds may be transmitted to the fourth node N4 through the (2-4)-th switching transistor M4.

The first switching transistors T41, T42, ..., and T4$n$ of the fourth sub-demultiplexer 514 may be sequentially turned on in response to the first control signals Es1, Es2, ..., and Es$n$ for the fourth period P4. Thus, the touch electrodes 410 included in the fourth electrode group 404 may be activated by sequentially receiving the driving signal Ds.

Figure 8:
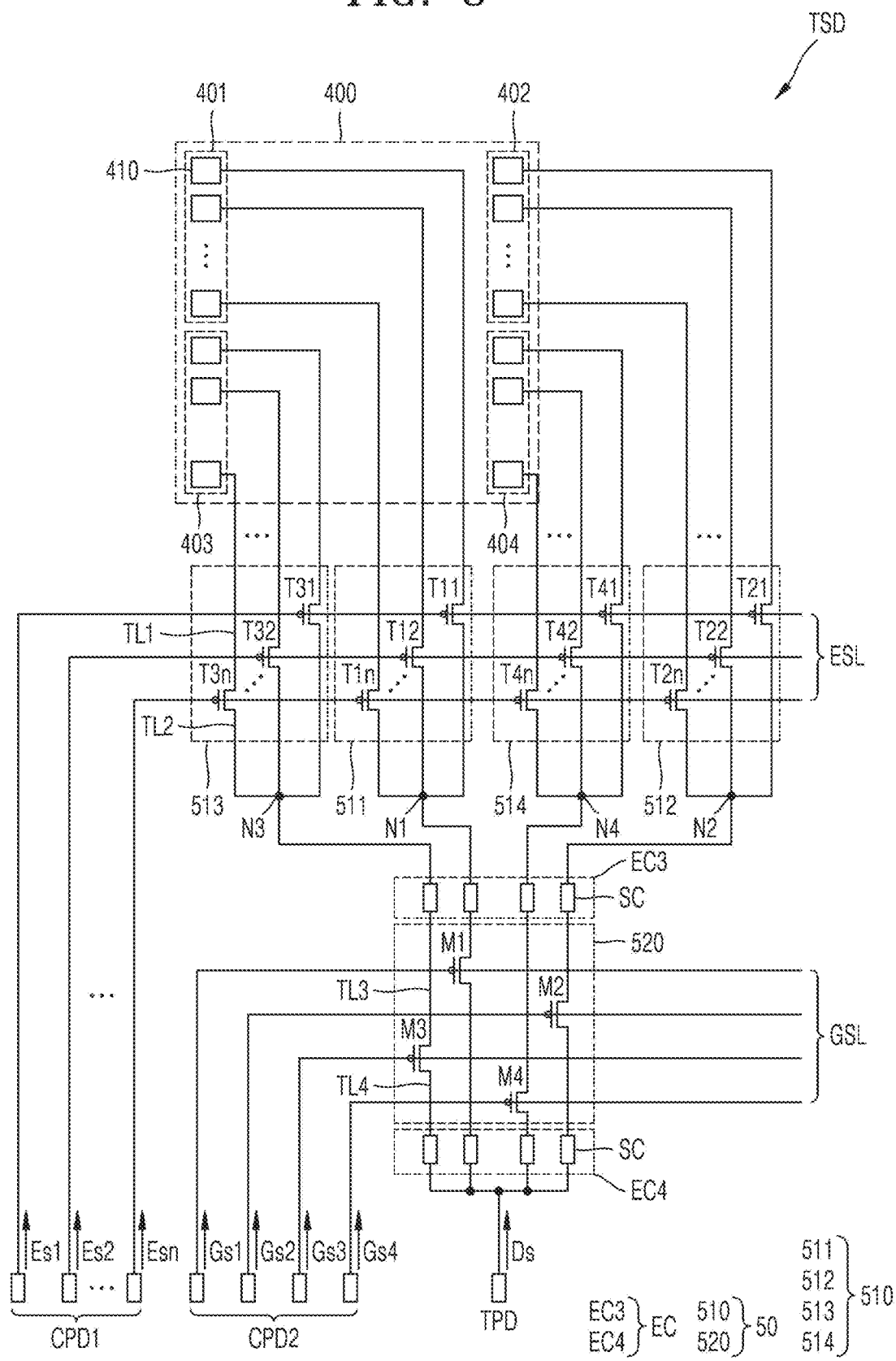
FIG. 8 is a diagram schematically illustrating a circuit of one touch sensing device according to an embodiment.

FIG. 8 is a diagram schematically illustrating a circuit of one touch sensing device according to an embodiment. FIG. 8 is similar to FIG. 6, but FIG. 8 is different from FIG. 6 in that the static electricity blocking unit EC is arranged at two sides of the second demultiplexer 520.

Referring to FIG. 8, the touch sensing device TSD may include an electrode unit 400, a touch signal distribution unit 50, a touch driving pad TPD, connection wirings TL1, TL2, TL3, and TL4, and control signal lines ESL and GSL.

The electrode unit 400 may include electrode groups 401, 402, 403, and 404. The electrode groups 401, 402, 403, and 404 may include a first electrode group 401, a second electrode group 402, a third electrode group 403, and a fourth electrode group 404. Each of the electrode groups 401, 402, 403, and 404 may include a plurality of touch electrodes 410.

The touch signal distribution unit 50 may be arranged between the electrode unit 400 and the touch driving pad TPD. The touch signal distribution unit 50 may include first demultiplexers 510 and second demultiplexers 520. Each of the first demultiplexers 510 may include a plurality of sub-demultiplexers 511, 512, 513, and 514. The plurality of sub-demultiplexers 511, 512, 513, and 514 may include a first sub-demultiplexer 511, a second sub-demultiplexer 512, a third sub-demultiplexer 513, and a fourth sub-demultiplexer 514.

The first demultiplexer 510 may include a plurality of first switching transistors T11, ..., and T4$n$, first connection wirings TL1, second connection wirings TL2, and first control signal lines ESL. The second demultiplexer 520 may include a plurality of second switching transistors M1, M2, M3, and M4, third connection wirings TL3, fourth connection wirings TL4, and second control signal lines GSL.

The touch sensing device TSD may include a static electricity blocking unit EC. The static electricity blocking unit EC may include protection circuits SC for protecting transistors of the touch signal distribution unit 50 from damage by high-voltage pulse.

In an embodiment, the static electricity blocking unit EC may include a third blocking unit EC3 and a second blocking unit EC4 arranged at two sides of the second demultiplexer 520. Each of the third blocking unit EC3 and the fourth blocking unit EC4 may include a plurality of protection circuits SC. The third blocking unit EC3 may be electrically connected to the third connection wirings TL3 of the second demultiplexer 520, and the fourth blocking unit EC4 may be electrically connected to the fourth connection wirings TL4 of the second demultiplexer 520.

In another embodiment, the static electricity blocking unit EC may include a first blocking unit (see EC1 of FIG. 6) and a second blocking unit (see EC2 of FIG. 6) arranged at two sides (e.g., two opposite sides) of the first demultiplexer 510, and a third blocking unit EC3 and a fourth blocking unit EC4, which are arranged at two sides of the second demultiplexer 520.

In another embodiment, the static electricity blocking unit EC may include a first blocking unit (see EC1 of FIG. 6) arranged between the first demultiplexer 510 and the electrode unit 400, and a third blocking unit EC3 and a fourth blocking unit EC4 positioned at two sides (e.g., two opposing sides) of the second demultiplexer 520.

Figure 9:
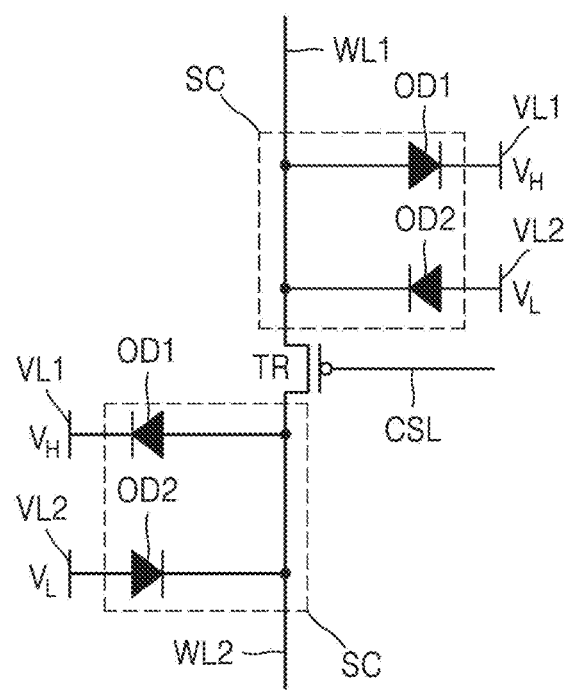
FIGS. 9 and 10 are circuit diagrams respectively schematically illustrating a static electricity blocking unit according to an embodiment.
Figure 10:
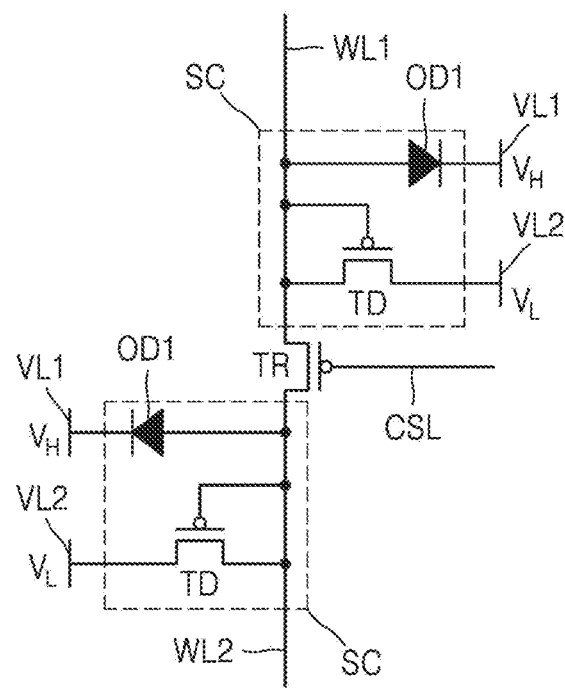

FIGS. 9 and 10 are circuit diagrams respectively schematically illustrating a static electricity blocking unit according to an embodiment.

The static electricity blocking unit EC shown in FIGS. 9 and 10 may be applied to the first demultiplexer 510, as shown in FIG. 6, or may be applied to the second demultiplexer 520, as shown in FIG. 8. For example, the transistors TR shown in FIGS. 9 and 10 may correspond to first switching transistors T11, ..., and T4$n$ of the first demultiplexer (see 510 of FIG. 6) or the second switching transistors M1, M2, M3, and M4 of the second demultiplexer (see 520 of FIG. 8).

A first terminal of each of the transistors TR may be electrically connected to a first wiring WL1, and a second terminal of the transistor TR may be electrically connected to the second wiring WL2, and a gate of the transistor TR may be electrically connected to a control signal line CSL.

When the transistor TR is one of the first switching transistors T11, ..., and T4$n$, the first wiring WL1 may correspond to the first connection wiring TL1, the second wiring WL2 may correspond to the second connection wiring TL2, and the control signal line CSL may correspond to the first control signal line ESL. When the transistor TR is one of the second switching transistors M1, M2, M3 and M4, the first wiring WL1 may correspond to the third connection wiring TL3, the second wiring WL2 may correspond to the fourth connection wiring TL4, and the control signal line CSL may correspond to the second control signal line GSL.

Referring to FIG. 9, the static electricity blocking unit EC may include protection circuits SC electrically connected to both terminals of a transistor TR in an internal circuit.

One protection circuit SC may include a first organic diode OD1 and a second organic diode OD2. Each of the first organic diode OD1 and the second organic diode OD2 may include a first electrode, a second electrode on the first electrode, and an organic layer located between the first electrode and the second electrode.

A first electrode of the first organic diode OD1 and a first electrode of the second organic diode OD2 that belong to one protection circuit SC may be electrically connected to the same wiring. For example, the first electrode of the first organic diode OD1 and the first electrode of the second organic diode OD2 that belong to the protection circuit SC on a first terminal of the transistor TR may be electrically connected to a first wiring WL1. The first electrode of the first organic diode OD1 and the first electrode of the second organic diode OD2 that belong to the protection circuit SC on a second terminal of the transistor TR may be electrically connected to a second wiring WL2.

A second electrode of the first organic diode OD1 may be electrically connected to a first voltage line VL1. A first voltage line VL1 may be configured to transmit a first voltage $V_H$ to the second electrode of the first organic diode OD1. A second electrode of the second organic diode OD2 may be electrically connected to a second voltage line VL2. The second voltage line VL2 may be configured to transmit a second voltage $V_L$ to the second electrode of the second organic diode OD2. The first voltage $V_H$ applied to the first voltage line VL1 may be greater than the second voltage $V_L$ applied to the second voltage line VL2.

In an embodiment, the first voltage $V_H$ my be a gate high-level voltage, and the second voltage $V_L$ may be a gate low-level voltage. The gate high-level voltage may be a voltage for turning on a gate of transistors connected to gate lines, and the gate low-level voltage may be a voltage for turning off a gate of transistors connected to the gate lines. In another embodiment, the second voltage $V_L$ may be a second power supply voltage (see ELVSS of FIG. 2) or a ground voltage.

When a voltage applied to the first wiring WL1 or the second wiring WL2 is greater than the sum of the first voltage $V_H$ and a threshold voltage of the first organic diode OD1 by static electricity, positive charges may flow through the first voltage line VL1 through the first organic diode OD1. When a voltage applied to the first wiring WL1 or the second wiring WL2 is lower than the sum of the second voltage $V_L$ and a threshold voltage of the second organic diode OD2 by static electricity, negative charges may flow through the second voltage line VL2 through the second organic diode OD2. Thus, a high current generated by static electricity may bypass the transistor TR, thereby reducing or preventing damage of the transistor TR by static electricity.

Referring to FIG. 10, in an embodiment, each of the protection circuits SC may include the first organic diode OD1 and a rectifier transistor TD.

The first organic diode OD1 may include a first electrode, a second electrode on the first electrode, and an organic layer between the first electrode and the second electrode. The rectifier transistor TD may include a semiconductor layer, a source electrode, a drain electrode, and a gate electrode, and the gate electrode of the rectifier transistor TD may be electrically connected to the drain electrode of the rectifier transistor TD.

A first electrode of the first organic diode OD1 and a gate electrode of the rectifier transistor TD that belong to one protection circuit SC may be electrically connected to the same wiring. For example, the first electrode of the first organic diode OD1 and the gate electrode and the drain electrode of the rectifier transistor TD that belong to the protection circuit SC on the first terminal of the transistor TR may be electrically connected to the first wiring WL1. The first electrode of the first organic diode OD1 and the gate electrode and the drain electrode of the rectifier transistor TD that belong to the protection circuit SC on the second terminal of the transistor TR may be electrically connected to the second wiring WL2. The second electrode of the first organic diode OD1 may be electrically connected to a first voltage line VL1, and the source electrode of the rectifier transistor TD may be electrically connected to the second voltage line VL2.

In another embodiment, each of the protection circuits SC may include the rectifier transistor TD and a second organic diode (see OD2 of FIG. 9) of which second electrode is electrically connected to the second voltage line VL2. In this case, the gate electrode and the drain electrode of the rectifier transistor TD may be electrically connected to the first voltage line VL1.

In embodiments of the disclosure, at least one of rectifier devices of the protection circuit SC may be formed as an organic diode so that the area of the protection circuit SC may be reduced. In this case, organic diodes may be simultaneously formed with the organic light-emitting diode OLED of the display area DA so that the protection circuit SC may be formed without adding a manufacturing process.

Figure 11:
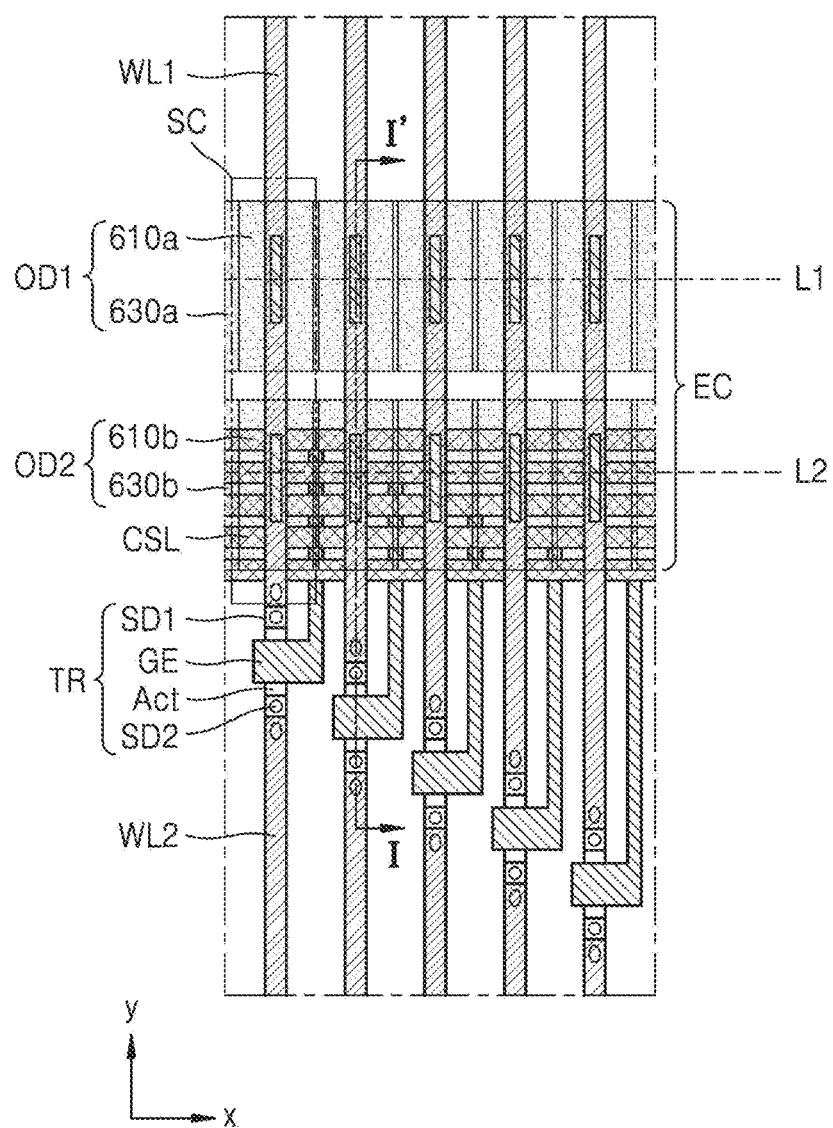
FIG. 11 is a plan view schematically illustrating a portion of a display apparatus according to an embodiment.
Figure 12:
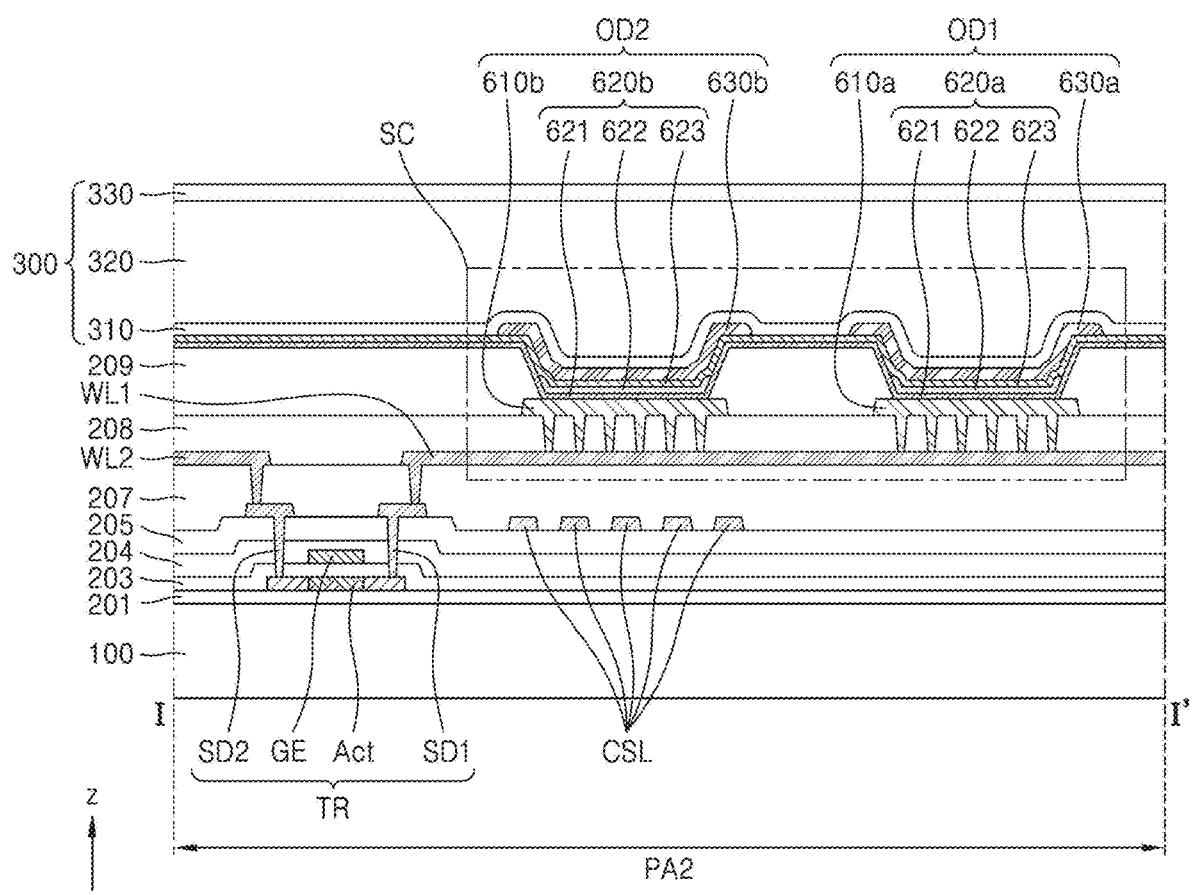
FIG. 12 is a cross-sectional view taken along a line I-I' of FIG. 11 and schematically illustrating the display apparatus.

FIG. 11 is a plan view schematically illustrating a portion of a display apparatus according to an embodiment, and FIG. 12 is a cross-sectional view taken along a line I-I' of FIG. 11 and schematically illustrating the display apparatus.

The static electricity blocking unit EC shown in FIGS. 11 and 12 may be applied to the first demultiplexer 510, as shown in FIG. 6, or may be applied to the second demultiplexer 520, as shown in FIG. 8. For example, the transistors TR shown in FIGS. 11 and 12 may correspond to first switching transistors T11, . . . , and T4n of the first demultiplexer (see 510 of FIG. 6) or the second switching transistors M1, M2, M3, and M4 of the second demultiplexer (see 520 of FIG. 8).

When the transistor TR is one of the first switching transistors T11, . . . , and T4n, the first wiring WL1 may correspond to the first connection wiring TL1, the second wiring WL2 may correspond to the second connection wiring TL2, and the control signal line CSL may correspond to the first control signal line ESL. When the transistor TR is one of the second switching transistors M1, M2, M3 and M4, the first wiring WL1 may correspond to the third connection wiring TL3, the second wiring WL2 may correspond to the fourth connection wiring TL4, and the control signal line CSL may correspond to the second control signal line GSL.

Referring to FIGS. 11 and 12, the static electricity blocking unit EC may include protection circuits SC electrically connected to the first wirings WL1.

A buffer layer 201 may be arranged on the substrate 100, and transistors TR may be arranged on the buffer layer 201. The transistors TR may be thin-film transistors and may include a semiconductor layer Act, a gate electrode GE, a first source-drain electrode SD1, and a second source-drain electrode SD2.

The semiconductor layer Act of the transistor TR may be disposed on the buffer layer 201 and may include polysilicon. In another embodiment, the semiconductor layer Act may include amorphous silicon. In another embodiment, the semiconductor layer Act may include oxide of at least one material selected from the group consisting of indium (In), gallium (Ga), stannum (Sn), zirconium (Zr), vanadium (V), hafnium (Hf), cadmium (Cd), germanium (Ge), chromium (Cr), titanium (Ti), and zinc (Zn). The semiconductor layer Act may include a channel region, and a source region and a drain region doped with impurities. The source region and the drain region may be connected to two opposite sides of the channel region.

A first gate insulating layer 203 may be arranged to cover the semiconductor layer Act, and a gate electrode GE may be arranged on the first gate insulating layer 203 to overlap the semiconductor layer Act of the transistor TR. A second gate insulating layer 204 and an interlayer insulating layer 205 may be arranged on the gate electrode GE.

A first source-drain electrode SD1 and a second source-drain electrode SD2 may be arranged on the interlayer insulating layer 205. The first source-drain electrode SD1 may be connected to one of source-drain regions of the semiconductor layer Act through a contact hole, and the second source-drain electrode SD2 may be connected to another one of the source-drain regions of the semiconductor layer Act through a contact hole. The first source-drain electrode SD1 and the second source-drain electrode SD2 and the source electrode SE and the drain electrode DE of the thin-film transistor TFT shown in FIG. 4 may have the same material. As used herein, the first source-drain electrode SD1 and the second source-drain electrode SD2 including the same material means that the first source-drain electrode SD1 and the second source-drain electrode SD2 are formed simultaneously through the same process, having the same material, membrane, layer structure and the like.

A first planarization insulating layer 207 may be arranged on the first source-drain electrode SD1 and the second source-drain electrode SD2, and a first wiring WL1 and a second wiring WL2 may be arranged on the first planarization insulating layer 207. The first wiring WL1 may be connected to the first source-drain electrode SD1 through a contact hole passing through the first planarization insulating layer 207, and the second wiring WL2 may be connected to the second source-drain electrode SD2 through a contact hole passing through the first planarization insulating layer 207.

A second planarization insulating layer 208 may be arranged on the first wiring WL1 and the second wiring WL2, and protection circuits SC may be arranged on the second planarization insulating layer 208. Each of the protection circuits SC may include a first organic diode OD1 and a second organic diode OD2.

A first electrode 610a of the first organic diode OD1 and a first electrode 610b of the second organic diode OD2 may be arranged on the second planarization insulating layer 208. Each of the first electrode 610a of the first organic diode OD1 and the first electrode 610b of the second organic diode OD2 may be connected to the first wiring WL1 through contact holes passing through the second planarization insulating layer 208.

The first electrode 610a of the first organic diode OD1 and the first electrode 610b of the second organic diode OD2 and the pixel electrode 210 of the organic light-emitting diode OLED shown in FIG. 4 may have the same material. In other words, the first electrode 610a of the first organic diode OD1 and the first electrode 610b of the second organic diode OD2 may be formed through the same process as a process of forming the pixel electrode 210 of the organic light-emitting diode OLED.

In a plan view, the first electrode 610a of the first organic diode OD1 and the first electrode 610b of the second organic diode OD2 may be arranged to overlap the first wiring WL1. When the first wirings WL1 and the second wirings WL2 extend in the first direction (e.g., the y-axis direction), first electrodes 610a of the first organic diodes OD1 may be arranged along an imaginary first straight line L1 that extends in a second direction (e.g., the x-axis direction) to be spaced apart from one another. The first electrodes 610b of the second organic diodes OD2 may be arranged along an imaginary second straight line L2 that extends in the second direction (e.g., the x-axis direction) to be spaced apart from one another.

A pixel-defining layer 209 may be configured to cover edges of each of the first electrode 610a of the first organic diode OD1 and the first electrode 610b of the second organic diode OD2 on the second planarization insulating layer 208 and may include openings for exposing the center of each of the first electrode 610a of the first organic diode OD1 and the first electrode 610b of the second organic diode OD2.

A first organic layer 620a may be arranged between the first electrode 610a and the second electrode 630a of the first organic diode OD1, and a second organic layer 620b may be arranged between the first electrode 610b and the second electrode 630b of the second organic diode OD2. Each of the first organic layer 620a and the second organic layer 620b and an intermediate layer 220 of the organic light-emitting diode OLED shown in FIG. 4 may include the same material. For example, each of the first organic layer 620a and the second organic layer 620b may include a first sub-organic layer 621, a second sub-organic layer 622, and a third sub-organic layer 623. The first sub-organic layer 621 and the first functional layer (see 221 of FIG. 4) may include the same material, the second sub-organic layer 622 and the light-emitting layer (see 222 of FIG. 4) may include the same material, and the third sub-organic layer 623 and the second functional layer (see 223 of FIG. 4) may include the same material. In an embodiment, one or more among the first sub-organic layer 621, the second sub-organic layer 622, and the third sub-organic layer 623 may be omitted. For example, each of the first organic layer 620a and the second organic layer 620b may include only the first sub-organic layer 621 and the third sub-organic layer 623. Alternatively, each of the first organic layer 620a and the second organic layer 620b may include only the first sub-organic layer 621 or the third sub-organic layer 623.

Each of the second electrode 630a of the first organic diode OD1 and the second electrode 630b of the second organic diode OD2 and the opposite electrode 230 of the organic light-emitting diode OLED shown in FIG. 4 may include the same material.

In a plan view, the second electrodes 630a of the first organic diodes OD1 adjacent in the second direction (e.g., the x-axis direction) may be integrally formed. In other words, the second electrodes 630a of the first organic diodes OD1 arranged along the imaginary first straight line L1 may be integrated into a single body. The second electrode 630a of the first organic diode OD1 may be electrically connected to a first voltage line (not shown).

In a plan view, the second electrodes 630*b* of the second organic diodes OD2 adjacent in the second direction (e.g., the x-axis direction) may be integrally formed. In other words, the second electrodes 630*b* of the second organic diodes OD2 arranged along the imaginary second straight line L2 may be integrally provided. The second electrode 630*b* of the second organic diode OD2 may be electrically connected to a second voltage line (not shown). The first voltage line may be configured to transmit a first voltage, the second voltage line may be configured to transmit a second voltage, and the first voltage may be greater than the second voltage.

The first organic diode OD1 and the second organic diode OD2 are formed above the first wiring WL1 or the second wiring WL2, in a plan view, the static electricity blocking unit EC may be arranged to overlap the touch signal distribution unit. Thus, the area occupied by the touch signal distribution unit and the static electricity blocking unit EC may be reduced.

An encapsulation layer 300 may be arranged on the protection circuit SC. The encapsulation layer 300 may include first and second inorganic encapsulation layers 310 and 330 and an organic encapsulation layer 320 therebetween.

According to one or more embodiments, a display apparatus in which circuit defects due to static electricity may be reduced, can be implemented. Of course, the scope of the disclosure is not limited by these effects.

It should be understood that embodiments described herein should be considered in a descriptive sense only and not for purposes of limitation. Descriptions of features or aspects within each embodiment should typically be considered as applicable to other similar features or aspects in different embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
   a substrate comprising a display area and a peripheral area outside the display area;
   light-emitting diodes arranged in the display area;
   an electrode unit comprising electrode groups arranged on the light-emitting diodes;
   a touch driving pad arranged in the peripheral area;
   a touch signal distribution unit including at least one demultiplexer arranged in the peripheral area and electrically connected between the electrode unit and the touch driving pad; and
   a static electricity blocking unit electrically connected to the touch signal distribution unit and comprising organic diodes,
   wherein each of the organic diodes comprises a first electrode, a second electrode arranged on the first electrode, and organic layer between the first electrode and the second electrode wherein the static electricity blocking unit includes at least two blocking units with two of the at least two blocking units arranged on two sides of one of the at least one demultiplexer.

2. The display apparatus of claim 1, wherein each of the light-emitting diodes further comprises a pixel electrode, an opposite electrode arranged on the pixel electrode, and an intermediate layer between the pixel electrode and the opposite electrode, and the first electrode and the pixel electrode include a same material, and the second electrode and the opposite electrode include a same material.

3. The display apparatus of claim 2, wherein the organic layer and the intermediate layer include a same material.

4. The display apparatus of claim 2, wherein the intermediate layer comprises a light-emitting layer, a first functional layer between the pixel electrode and the light-emitting layer, and a second functional layer between the opposite electrode and the light-emitting layer, and the organic layer includes a same material as at least one of the first functional layer and the second functional layer.

5. The display apparatus of claim 1, wherein the organic diodes comprise a first organic diode and a second organic diode, and a second electrode of the first organic diode is electrically connected to a first voltage line, and a second electrode of the second organic diode is electrically connected to a second voltage line, and a first voltage applied to the first voltage line is greater than a voltage applied to the second voltage line.

6. The display apparatus of claim 1, wherein the static electricity blocking unit further comprises rectifier transistors, and a second electrode of each of the organic diodes is electrically connected to a first voltage line, and each of the rectifier transistors comprises a semiconductor layer and a gate electrode on the semiconductor layer, wherein the semiconductor layer comprises a source region, a drain region, and a channel region between the source region and the drain region, and the gate electrode is electrically connected to the drain region, and the source region is electrically connected to a second voltage line.

7. The display apparatus of claim 6, wherein a first voltage applied to the first voltage line is greater than a second voltage applied to the second voltage line.

8. The display apparatus of claim 7, wherein the first voltage includes a gate high-level voltage, and the second voltage includes a gate low-level voltage.

9. The display apparatus of claim 1, wherein the touch signal distribution unit comprises a first demultiplexer and a second demultiplexer configured to electrically connect the first demultiplexer to the touch driving pad, and the first demultiplexer comprises sub-demultiplexers, and each of the sub-demultiplexers is electrically connected to one of the electrode groups.

10. The display apparatus of claim 9, wherein the second demultiplexer is further configured to sequentially connect the sub-demultiplexers to the touch driving pad in response to first control signals.

11. The display apparatus of claim 10, wherein the sub-demultiplexer connected to the touch driving pad is configured to sequentially connect touch electrodes of a corresponding electrode group to the second demultiplexer in response to second control signals.

12. The display apparatus of claim 9, wherein the static electricity blocking unit comprises a first blocking unit and a second blocking unit arranged at two sides of the first demultiplexer.

13. The display apparatus of claim 9, wherein the static electricity blocking unit comprises a third blocking unit and a fourth blocking unit arranged at two sides of the second demultiplexer.

14. The display apparatus of claim 9, wherein each of the sub-demultiplexer comprises:
   first switching transistors;
   first connection wirings configured to electrically connect a first source-drain electrode of each of the first switching transistors to a corresponding touch electrode; and second connection wirings configured to electrically connect a second source-drain electrode of each of the first switching transistors to the second demultiplexer.

15. The display apparatus of claim 14, wherein a number of the first switching transistors is same as a number of the touch electrodes of each of the electrode groups.

16. The display apparatus of claim 14, wherein the second demultiplexer comprises:
   second switching transistors;
   third connection wirings configured to electrically connect a first source-drain electrode of each of the second switching transistors to a corresponding sub-demultiplexer; and
   fourth connection wirings configured to electrically connect a second source-drain electrode of each of the second switching transistors to the touch driving pad.

17. The display apparatus of claim 16, wherein a number of the second switching transistors is same as a number of the sub-demultiplexers.

18. The display apparatus of claim 16, wherein a first electrode of each of the organic diodes is electrically connected to one of the first connection wirings, the second connection wirings, the third connection wirings, and the fourth connection wirings, and a second electrode of each of the organic diodes is electrically connected to a first voltage line or a second voltage line.

19. The display apparatus of claim 16, wherein a first electrode of each of the organic diodes overlaps one of the first connection wirings, the second connection wirings, the third connection wirings, and the fourth connection wirings in a plan view.

20. The display apparatus of claim 16, wherein the first connection wirings, the second connection wirings, the third connection wirings, and the fourth connection wirings extend in a first direction, and second electrodes of the organic diodes are arranged along an imaginary straight line extending in a second direction crossing the first direction, are integrated into a single body.

\* \* \* \* \*